US008646323B2

(12) United States Patent
Takashima

(10) Patent No.: US 8,646,323 B2
(45) Date of Patent: Feb. 11, 2014

(54) APPARATUS OF ESTIMATING FUEL INJECTION STATE

(75) Inventor: Yoshimitsu Takashima, Anjo (JP)

(73) Assignee: Denso Corporation, Kariya (JP)

( * ) Notice: Subject to any disclaimer, the term of this patent is extended or adjusted under 35 U.S.C. 154(b) by 22 days.

(21) Appl. No.: 13/426,657

(22) Filed: Mar. 22, 2012

(65) Prior Publication Data

US 2012/0240670 A1 Sep. 27, 2012

(30) Foreign Application Priority Data

Mar. 24, 2011 (JP) ................................ 2011-65309

(51) Int. Cl.
*G01M 15/04* (2006.01)

(52) U.S. Cl.
USPC .................................. 73/114.49; 73/114.51

(58) Field of Classification Search
USPC ........................................ 73/114.49, 114.51
See application file for complete search history.

(56) References Cited

U.S. PATENT DOCUMENTS

| | | | | |
|---|---|---|---|---|
| 4,311,043 | A * | 1/1982 | Reid et al. | 73/114.51 |
| 8,406,982 | B2 * | 3/2013 | Yamada et al. | 701/103 |
| 8,423,263 | B2 * | 4/2013 | Yamada et al. | 701/103 |
| 2008/0228374 | A1 | 9/2008 | Ishizuka et al. | |
| 2009/0112444 | A1 | 4/2009 | Ishizuka et al. | |
| 2009/0319157 | A1 | 12/2009 | Ishizuka | |
| 2009/0326788 | A1 | 12/2009 | Yuasa et al. | |
| 2010/0250095 | A1 * | 9/2010 | Yamada et al. | 701/103 |
| 2010/0250096 | A1 * | 9/2010 | Yamada et al. | 701/103 |
| 2010/0250097 | A1 | 9/2010 | Yamada et al. | |
| 2012/0072134 | A1 * | 3/2012 | Takashima | 702/50 |

OTHER PUBLICATIONS

Office Action (2 pages) dated Mar. 5, 2013, issued in corresponding Japanese Application No. 2011-065309 and English translation (2 pages).

* cited by examiner

*Primary Examiner* — Freddie Kirkland, III
(74) *Attorney, Agent, or Firm* — Nixon & Vanderhye P.C.

(57) ABSTRACT

An apparatus of estimating fuel injection state of a fuel injection system have at least three injectors. The first and second injectors have fuel pressure sensors respectively. The third injector has no fuel pressure sensor. The apparatus detects an injected cylinder waveform to the first injector when the first injector injects fuel. The apparatus detects a first non-injected cylinder waveform to the second injector when the first injector injects fuel. The apparatus calculates correlations between the injected cylinder waveform and the first non-injected cylinder waveform. The apparatus acquires a second non-injected cylinder waveform detected by the first or second fuel pressure sensor when the third injector injects fuel. The apparatus estimates fuel injection state injected from the third injector based on the second non-injected cylinder waveform and the correlations.

13 Claims, 12 Drawing Sheets

(e) DELAY $$Atd = \frac{tdb}{tdu'} \text{ or } \frac{td}{tdu'}$$

$$Btd = \frac{tdb}{tdu} \text{ or } \frac{td}{tdu}$$

(f) Q $$AQ = \frac{Q}{\Delta Pu'} \text{ or } \frac{\Delta Pb}{\Delta Pu'} \text{ or } \frac{Rmax}{\Delta Pu'}$$

$$BQ = \frac{Q}{\Delta Pu} \text{ or } \frac{\Delta Pb}{\Delta Pu} \text{ or } \frac{Rmax}{\Delta Pu}$$

APPARATUS OF ESTIMATING FUEL INJECTION STATE

CROSS REFERENCE TO RELATED APPLICATION

This application is based on Japanese Patent Application No. 2011-65309 filed on Mar. 24, 2011, the disclosure of which is incorporated herein by reference.

TECHNICAL FIELD

The present disclosure relates to an apparatus of estimating fuel injection state, such as a start timing of fuel injection, and a fuel injection amount.

BACKGROUND

JP2009-103063A, JP2010-3004A, and JP2010-223184A disclose apparatus for calculating fuel injection state based on an injected cylinder waveform. The injected cylinder waveform shows pressure change caused by a fuel injection for one cylinder. The injection cylinder waveform can be detected by monitoring fuel pressure supplied to an injector, e.g., a fuel injection valve, by a fuel pressure sensor. The apparatus calculates the fuel injection states based on a behavior of a fuel injection system in which a beginning of pressure drop caused by a fuel injection and a start timing of fuel injection have high level of correlation. For example, the apparatus calculates a start timing of fuel injection based on a beginning of pressure drop detected from the injected cylinder waveform. The apparatus utilizes the calculated fuel injection state to perform a feedback control for an injector. This enables it to control fuel injection state to a desired state with high accuracy.

SUMMARY

According to the conventional techniques, a multi-cylinder engine needs a plurality of fuel pressure sensors for a plurality of injectors, respectively. As a result, such a plurality of fuel pressure sensors may increase cost.

It is an object of the present disclosure to provide a fuel injection state estimating apparatus that needs less number of fuel pressure sensors than the number of injectors. It is another object of the present to provide a fuel injection state estimating apparatus that is capable of estimating fuel injection state from an injector by using a fuel pressure sensor provided close to the other injector.

According to one embodiment of the present disclosure, a fuel injection state estimating apparatus is provided.

The apparatus of estimating fuel injection state may be applied to a fuel injection system. The fuel injection system has at least three injectors including a first, second and third injectors provided for a first, second and third cylinders of an internal combustion engine respectively. The fuel injection system includes a first fuel pressure sensor which detects pressure of fuel supplied to the first injector for one cylinder. The fuel injection system also includes a second fuel pressure sensor which detects pressure of fuel supplied to the second injector for another cylinder.

The apparatus includes a first acquisition section which acquires an injected cylinder waveform, the injected cylinder waveform being shown by fuel pressure change detected by the first fuel pressure sensor when the first injector injects fuel. The apparatus also includes a second acquisition section which acquires a first non-injected cylinder waveform, the first non-injected cylinder waveform being shown by fuel pressure change detected by the second fuel pressure sensor when the first injector injects fuel.

The apparatus includes a correlation calculation section which calculates a correlation between the injected cylinder waveform and the first non-injected cylinder waveform. The apparatus includes a third acquisition section which acquires a second non-injected cylinder waveform, the second non-injected cylinder waveform being shown by fuel pressure change detected by the first or second fuel pressure sensor when the third injector injects fuel. The apparatus includes an injection state estimation section which estimates fuel injection state injected from the third injector based on the second non-injected cylinder waveform and the correlation.

The injected cylinder waveform of fuel supplied to the first injector when the first injector injects fuel may be referred to as the first injected cylinder waveform. Although, the pressure change of fuel supplied to the third injector when the third injector injects fuel is not detectable since the third injector has no pressure sensor, it may be referred to as the second injected cylinder waveform.

Correlations A1 and B1 between the first injected cylinder waveform and the first non-injected cylinder waveform is mostly in agreement with correlations A2 and B2 between the second injected cylinder waveform and the second non-injected cylinder waveform. This means it is possible to estimate or calculate the second injected cylinder waveform, even the system has no third fuel pressure sensor for directly detecting the second injected cylinder waveform.

According to one embodiment of the present disclosure, correlations, e.g., a ratio or a difference, between a first injection delay time and a first drop delay time when the first injector injects fuel is mostly in agreement with correlations between a second injection delay time and a second drop delay time when the third injector injects fuel. This means it is possible to estimate or calculate a second injection delay time as the fuel injection state based on the second drop delay time and the correlation calculated based on the first injection delay time and the first drop delay time.

According to one embodiment of the present disclosure, correlations, e.g., a ratio or a difference, between a first waveform change amount of the injected cylinder and the first waveform change amount of the non-injected cylinder when the first injector injects fuel is mostly in agreement with correlations between a second waveform change amount of the injected cylinder and a second waveform change amount of the non-injected cylinder when the third injector injects fuel. This means it is possible to estimate or calculate a second waveform change as the fuel injection state, e.g., a fuel injection amount, based on the second waveform change amount of the non-injected cylinder and the correlation.

According to one embodiment of the present disclosure, an injection start timing from the first injector and pressure drop start timing on the non-injected cylinder waveform have high correlation. As a result, an integrated value calculated by setting the pressure drop start timing as a start timing of an integration window and changing amount of waveform on the injected cylinder waveform have correlation. Therefore, it is possible to improve accuracy for estimating fuel injection amount from the third injector.

According to one embodiment of the present disclosure, although a pressure change corresponding to a start of fuel injection from the first injector appears on the non-injected cylinder waveform, a pressure change corresponding to a finish of fuel injection does not appear. However, a timing when a drop delay time is elapsed from an injection finish command signal and an injection finish timing have high correlation. The drop delay time is obtained as a period of time until a start timing of pressure drop from an injection start command signal. Therefore, it is possible to improve accuracy for estimating fuel injection amount from the third injector by calculating an integrated value of the non-injected cylinder waveform by using an integration window being defined with a finish timing which is obtained by a timing when the drop delay time is elapsed from an injection finish command signal.

According to one embodiment of the present disclosure, when the second non-injected cylinder waveform is detected in a pressurizing period, the injection state is estimated based on the correlation for the pressurizing period. On the other hand, when the second non-injected cylinder waveform is detected in a non-pressurizing period, the injection state is estimated based on the correlation for the non-pressurizing period. Therefore, it is possible to improve accuracy of estimation.

According to one embodiment of the present disclosure, the correlation to be used for estimating the injection state is adjusted based on a map on which the correlation is stored in a manner that the correlation is associated with a pressure just before the pressure drops. Therefore, it is possible to improve accuracy of estimation.

According to one embodiment of the present disclosure, the first fuel pressure sensor is arranged to a downstream side of a pressure accumulation container. Therefore, it is possible to detect the injected cylinder waveform with high accuracy.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereafter, a plurality of embodiments of the present disclosure are described based on the drawings. An apparatus for estimating fuel injection state and a method for estimating fuel injection state of an injector, e.g., a fuel injection valve, which does not have a sensor for monitoring a pressure at the injector. The apparatus is designed to control an internal combustion engine, i.e., engine. The apparatus designed to be mounted on a vehicle to control an engine for driving the vehicle. The engine may be a diesel engine which is supplied with high-pressure fuel and performs compression-self-ignition combustion. The engine is a multi-cylinder engine. In the following embodiment, the engine is a four-cylinder engine having a cylinder #1 to a cylinder #4. The reference symbols #1, #2, #3, and #4 may be used to identify one specific cylinder. The reference symbols #1, #2, #3, and #4 may also be used to identify components or characteristics related to or depending on the identified cylinder, e.g., an injector provided for the identified cylinder.

(First Embodiment)

Figure 1:
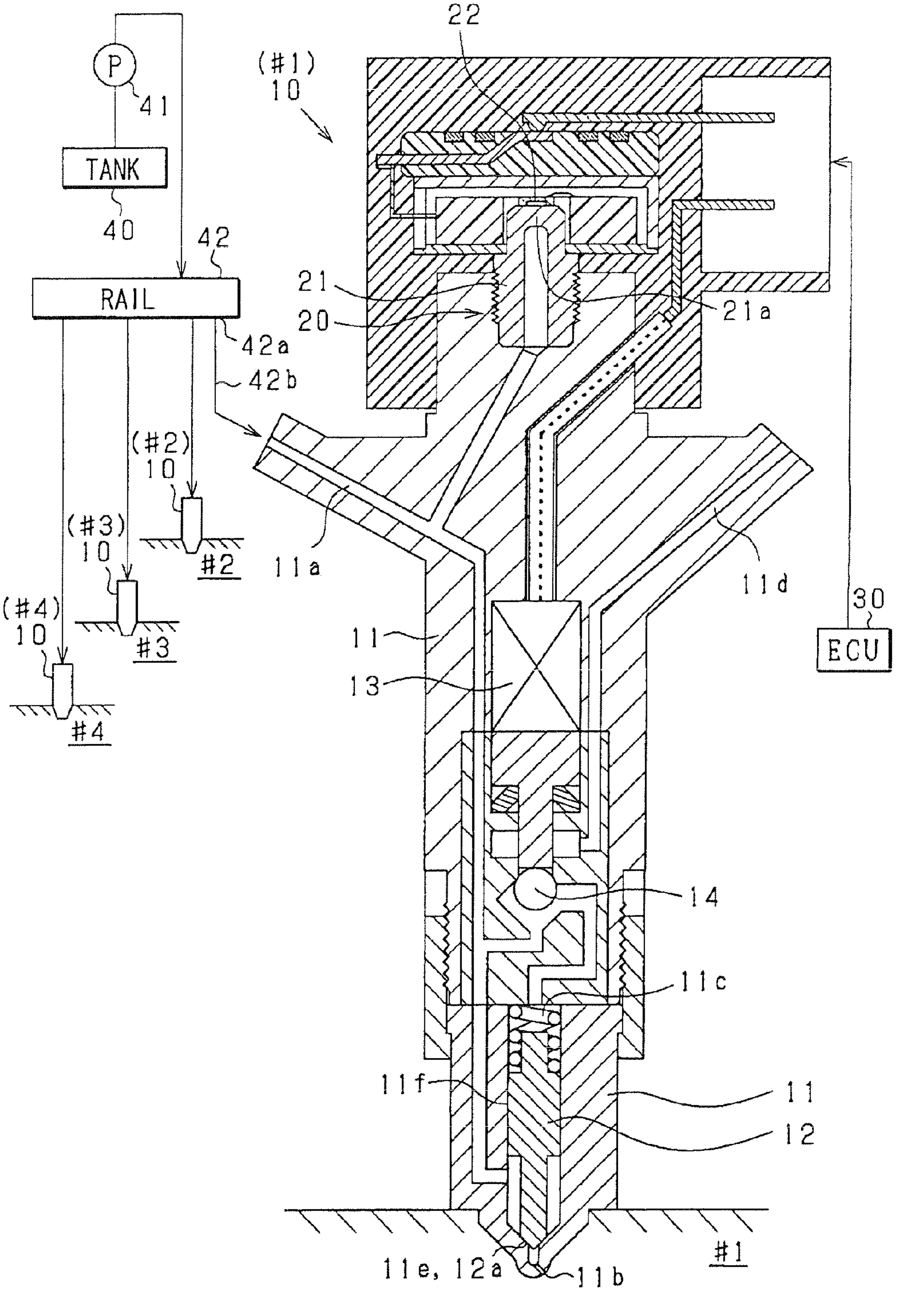
FIG. 1 is a diagram showing a fuel injection system and an injector according to a first embodiment of the present disclosure.

FIG. 1 shows components of a fuel injection system according to a first embodiment of the present disclosure. The fuel injection system includes a plurality of injectors 10. Each of the injectors 10 is provided for corresponding cylinder of the engine. The injector 10 for the cylinder #1 has a fuel pressure sensor 20 which detects fuel pressure in the injector 10 and outputs electric signal indicative of the detected fuel pressure. The injector 10 for the cylinder #3 has the same structure as illustrated. The injectors 10 for the cylinders #2 and #4 do not have fuel pressure sensor. The fuel injection system further includes an electronic control unit (ECU) 30. The fuel injection system is mounted on a vehicle.

The injectors 10 are components of the fuel injection system. The fuel injection system includes a fuel tank 40 for liquid diesel fuel. The fuel injection system includes a fuel pump 41 and a common rail 42 for providing a fuel supply system. The fuel pump 41 draws fuel in the fuel tank 40 and pressurizes fuel. The fuel pump 41 supplies pressurized fuel to the rail 42. The rail 42 is used as a pressurized fuel container. The rail 42 also works as a delivery device which delivers pressurized fuel to the injectors 10. The fuel injection system includes the fuel pump 41 and the pressurized fuel container 42. The injectors 10 for the cylinders #1 to #4 inject fuel one by one in a predetermined order. In this embodiment, it is assumed that fuel injection is performed in an order of #1, #3, #4, and #2.

The fuel pump 41 is provided by a plunger pump. Therefore, fuel is pressurized in a synchronizing manner with reciprocation of a plunger. The fuel pump 41 is configured to be driven by a driving source, e.g., a crankshaft of the engine. In this case, the fuel pump 41 pressurizes fuel a predetermined times per one combustion cycle. The fuel injection system is configured to accumulate fuel pressurized by the fuel pump 41 in the pressurized fuel container 42. The fuel injection system is configured to deliver pressurized fuel from the pressurized fuel container 42 to the first, second and third injectors 10.

The injector 10 has a body 11, a valve member 12 having a needle shape, and an actuator 13. The body 11 defines a high pressure passage 11*a* therein and at least one nozzle hole 11*b* which injects fuel into the corresponding cylinder. The valve member 12 is accommodated in the body 11 in a movable manner, and opens and closes the nozzle hole 11*b*.

The body 11 defines a backpressure chamber 11*c* which applies a backpressure to the valve member 12. The high pressure passage 11*a* is formed to be capable of communicating the backpressure chamber 11*c*. The body 11 also defines a low pressure passage 11*d* which is formed to be capable of communicating the backpressure chamber 11*c*. The injector 10 has a control valve 14 which switches communications to the backpressure chamber 11. The control valve 14 selectively provides a communication between the backpressure chamber 11*c* and the high pressure passage 11*a* and a communication between the backpressure chamber 11*c* and the low pressure passage 11*d*. The control valve 14 is operated by the actuator 13 such as an electromagnetic coil and a piezo-electric device. When the actuator 13 is activated and pushes the control valve 14 downwardly in the drawing, the backpressure chamber 11*c* is communicated with the low pressure passage 11*d* so that pressure in the backpressure chamber 11*c* is lowered. As a result, the backpressure applied to the valve member 12 is decreased. The valve member 12 is lifted upwardly to open the valve. Thereby, a seat surface 12*a* of the valve member 12 is distanced from a seat surface 11*e* of the body 11, and enables fuel to be injected from the nozzle hole 11*b*.

On the other hand, when the actuator 13 is deactivated and allows the control valve 14 to move upwardly in the drawing, the backpressure chamber 11*c* is communicated with the high pressure passage 11*a* so that pressure in the backpressure chamber 11*c* is increased. As a result, the backpressure applied to the valve member 12 is increased. The valve member 12 is urged downwardly to close the valve. Thereby, the seat surface 12*a* of the valve member 12 rests on the seat surface 11*e* of the body 11, and stops fuel injection from the nozzle hole 11*b*.

Therefore, the opening-and-closing operation of the valve member 12 is controlled by controlling the actuator 13 by the ECU 30. Thereby, the high pressure fuel supplied to the high pressure passage 11*a* from the rail 42 is injected from the nozzle hole 11*b* according to the opening-and-closing operation of the valve member 12.

In this embodiment, all the injectors 10 do not have the fuel pressure sensor 20. However, at least two injectors 10 have the fuel pressure sensor 20. Therefore, the number of the fuel pressure sensors 20 is less than the number of the injectors. The number of the fuel pressure sensors 20 is equal to or greater than two. In this embodiment, the fuel pressure sensor 20 is mounted on the injectors 10 for the cylinders #1 and #3. The fuel pressure sensor 20 is not mounted on the injectors 10 for the cylinders #4 and #2.

The fuel pressure sensor 20 is configured to have components such as a stem 21 and a pressure sensing element 22. The stem 21 is a member for generating distortion corresponding to pressure and applies generated distortion to the pressure sensing element 22. The stem 21 is attached to the body 11. The stem 21 provides a diaphragm portion 21*a* which can be deformed resiliently in response to pressure of fuel in the high pressure passage 11*a*. The fuel pressure sensor 20 is disposed on the fuel passage 11*a* from an outlet of the pressurized fuel container 42 to a nozzle hole 11*b* of the injector 10. The pressure sensing element 22 is attached to the diaphragm portion 21*a*. The pressure sensing element 22 generates a signal indicative of an amount of resilient deformation on the diaphragm portion 21*a* and outputs the signal to the ECU 30.

The ECU 30 calculates a target injection state based on input signals indicative of operating condition of the engine. The target injection state may be shown by at least one of a number of injection stages, an injection start timing, an injection finish timing, and a fuel injection amount. The input signals may include at least one of an operated amount of an accelerator, an engine load, and an engine rotation speed NE, etc. For example, the ECU 30 may have a section or module that can set the target injection state based on a map. The map may store the optimal injection state corresponding to the operating condition of the engine, such as an engine load and an engine rotation speed. In this case, the apparatus provided by the ECU 30 calculates the target injection state by looking up the map based on present values of the engine load and the engine rotation speed. Then, the apparatus sets injection command signals corresponding to the calculated target injection state based on injection rate parameters td, te, Rα (R-Alpha), Rβ (R-Beta), and Rmax. The injection command signals may be defined by parameters such as t1, t2 and Tq shown in FIG. 2. The apparatus outputs the injection command signals to the injectors 10 and controls the injectors 10. A leading edge of the injection command signal defines a start timing t1 of injection and may be referred to as an injection start command signal. A period Tq of the injection command signal defines an amount of injected fuel. A trailing edge of the injection command signal defines a finish timing t2 of injection and may be referred to as an injection finish command signal.

A method of controlling fuel injection is explained below. First, referring to FIG. 2 to FIG. 5, a method of controlling fuel injection from the injectors 10 for the cylinders #1 and #3 in which the fuel pressure sensors 20 are mounted is explained.

Figure 2:
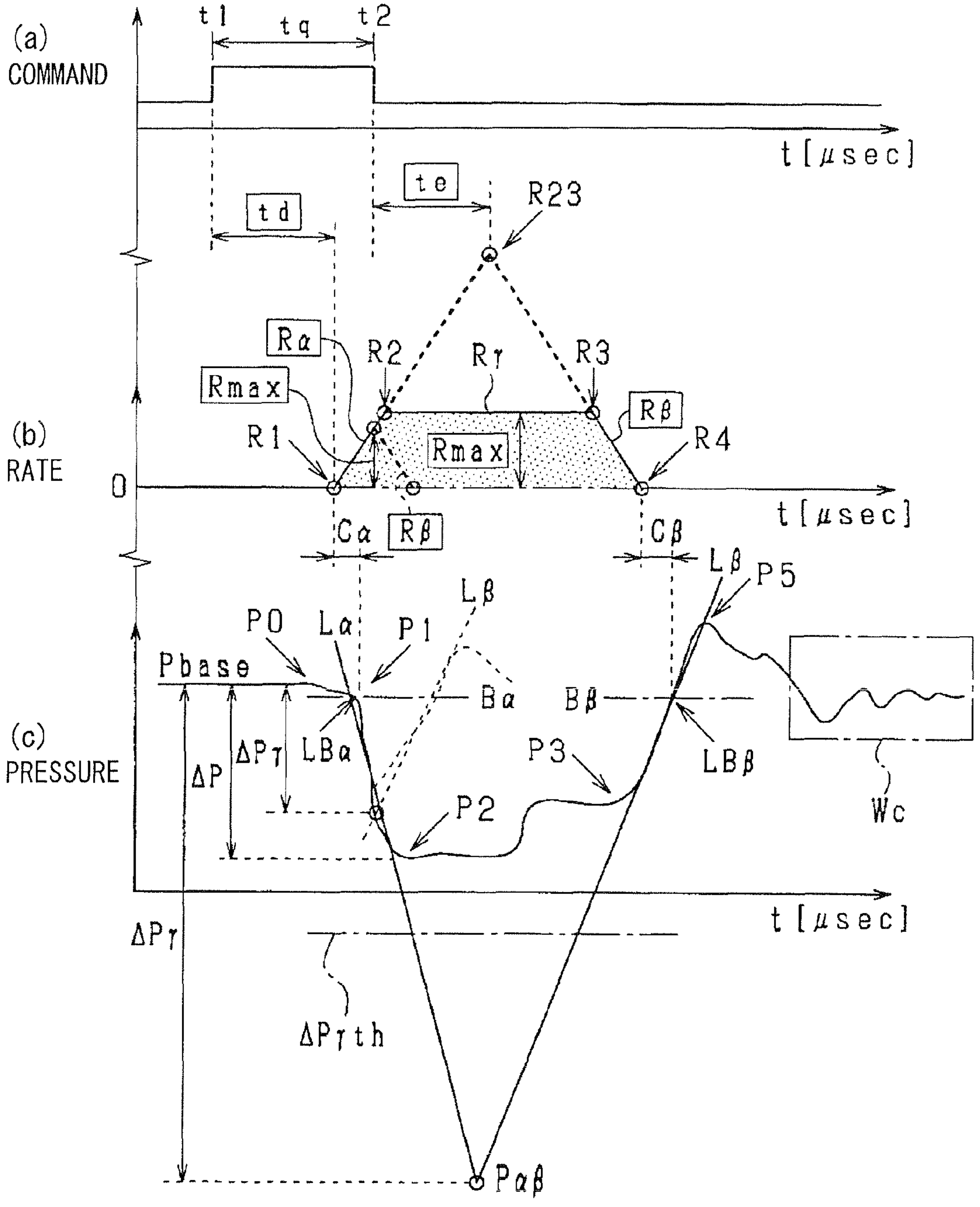
FIG. 2 is a timing diagram showing behavior of the fuel injection system in response to an injection command signal.

The apparatus outputs an injection command signal as shown in a waveform (a) in FIG. 2. The injector 10 injects fuel in response to the injection command signal. The fuel pressure sensor 20 detects fuel pressure supplied to the corresponding injector 10. The apparatus monitors fuel pressure change caused by fuel injection and detects a waveform of fuel pressure showing the fuel pressure change caused by the fuel injection. A waveform (c) in FIG. 2 shows an example of a waveform of fuel pressure. The apparatus calculates a waveform of injection rate as shown in a waveform (b) in FIG. 2. The injection rate shows an amount of fuel injected. The injection rate may be calculated based on the fuel pressure waveform detected. The apparatus calculates injection rate parameters Rα, Rβ, and Rmax which identifies a waveform of the injection rate. The apparatus learns the injection rate parameters by storing them. The injection rate waveform shows injection state. The apparatus calculates a correlation between the injection command signal and the injection state. The correlation may be calculated as a mathematical function such as a correlation coefficient between the injection command signal and the injection state. The injection command signal is defined by the start timing t1, the period Tq, and the finish timing t2. The apparatus may calculate injection rate parameters, such as td, and te, which defines a correlation between the injection command signal and the injection state. The apparatus learns the correlation by storing the injection rate parameters td and te.

In detail, the apparatus calculates a descent approximation straight-line Lα (L-Alpha) based on the detected waveform by using known method, such as the least square method. The descent approximation straight-line Lα approximates a descending part of the waveform from an inflection point P1 where a drop of fuel pressure begins in response to a start of injection to an inflection point P2 where the drop of fuel pressure ends. Then, the apparatus calculates a timing where the descent approximation straight-line Lα reaches to a reference value Bα (B-Alpha). The timing is defined as a crossing timing LBα where the line Lα crosses the level Bα. According to the inventor's analysis, a start timing R1 of fuel injection has high correlation with the crossing timing LBα. The apparatus is designed based on the analysis, and calculates a start timing R1 of fuel injection based on the crossing timing LBα. For example, the apparatus may be configured to calculate the injection start timing R1 by calculating a timing before the crossing timing LBα by a predetermined delay time Cα.

The apparatus calculates an ascent approximation straight-line Lβ (L-Beta) based on the detected waveform by using known method, such as the least square method. The ascent approximation straight-line Lβ approximates an ascending part of the waveform from an inflection point P3 where an ascending of fuel pressure begins in response to a finish of injection to an inflection point P5 where the ascending of fuel pressure ends. Then, the apparatus calculates a timing where the ascent approximation straight-line Lβ reaches to a reference value Bβ (B-Beta). The timing is defined as a crossing timing LBβ where the line Lβ crosses the level Bβ. According to the inventor's analysis, a finish timing R4 of fuel injection has high correlation with the crossing timing LBβ. The apparatus is designed based on the analysis, and calculates a finish timing R4 of fuel injection based on the crossing timing LBβ. For example, the apparatus may be configured to calculate the injection finish timing R4 by calculating a timing before the crossing timing LBβ by a predetermined delay time Cβ.

According to the inventor's analysis, an inclination of the descent approximation straight-line Lα has high correlation with an inclination of increasing part of fuel injection which is shown by a line Rα on the waveform (b) in FIG. 2. The apparatus is designed based on the analysis, and calculates an inclination of the line Rα based on the descent approximation straight-line Lα. For example, the inclination of the line Rα may be calculated by multiplying a predetermined coefficient by the inclination of the line Lα. Similarly, an inclination of the ascent approximation straight-line Lβ has high correlation with an inclination of decreasing part of fuel injection which is shown by a line Rβ on the waveform (b) in FIG. 2. The apparatus is designed based on the analysis, and calculates an inclination of the line Rβ based on the ascent approximation straight-line Lβ.

Then, the apparatus calculates a valve closure start timing R23 where the valve member 12 begins downward motion in response to the trailing edge of the injection command signal. In detail, the apparatus calculates a crossing point of the lines Rα and Rβ, and calculates a crossing timing of the lines Rα and Rβ as the valve closure start timing R23. The apparatus calculates injection delays, such as an injection start delay time td and an injection finish delay time te. The injection start delay time may be calculated as a delay time of the injection start timing R1 with respect to the start timing t1 of the injection command signal. The injection finish delay time te may be calculated as a delay time of the valve closure start timing R23 with respect to the finish timing t2 of the injection command signal.

The apparatus calculates a crossing pressure Pαβ (P-Alpha-Beta) which is shown by a pressure corresponding to a crossing of the descent approximation straight-line Lα and the ascent approximation straight-line Lβ. The apparatus calculates a pressure difference ΔPγ (Delta-P-Gamma) between the standard pressure Pbase and the crossing pressure Pαβ. This calculation is explained later. The pressure difference ΔPγ and the maximum injection rate Rmax has high correlation. The apparatus uses this characteristic and calculates the maximum injection rate Rmax based on the pressure difference ΔPγ. The maximum injection rate Rmax may be calculated by multiplying the pressure difference ΔPγ by a correlation coefficient Cγ. In detail, the apparatus uses an expression $Rmax=\Delta P\gamma \times C\gamma$ to obtain the maximum injection rate Rmax in case of a small amount injection in which the pressure difference ΔPγ is less than a predetermined amount ΔPγth ($\Delta P\gamma<\Delta P\gamma th$). On the other hand, the apparatus uses a predetermined value, such as a preset value Rγ, as the maximum injection rate Rmax in case of a large amount injection in which the pressure difference ΔPγ is equal to or greater than a predetermined amount ΔPγth ($\Delta P\gamma>=\Delta P\gamma th$).

An injection in which the valve member 12 starts downward motion before an injection rate reaches to the preset value Rγ is assumed to be the small amount injection. Therefore, in the small amount injection, the maximum injection rate Rmax is an injection rate when the seat surfaces 11*e* and 12*a* restricts fuel flow and a fuel injection amount. On the other hand, an injection in which the valve member 12 starts downward motion after an injection rate reaches to the preset value Rγ is assumed to be the large amount injection. Therefore, in the large amount injection, the maximum injection rate Rmax is an injection rate when the nozzle hole 11*b* restricts fuel flow and an fuel injection amount. In other word, an injection rate waveform, i.e., a waveform (b) in FIG. 2, becomes a trapezoid when the period Tq is long enough to keep opening condition after reaching to the maximum injection rate. On the other hand, an injection rate waveform becomes a triangle in the small amount injection in which the period Tq is short to start closing motion before reaching to the maximum injection rate.

The preset value Rγ is prepared to simulate the maximum injection rate Rmax for the large amount injection. The preset value Rγ shall be changed with aging of the injector 10. For example, accumulation of foreign substances, such as a deposit, on the nozzle hole 11*b* may decrease a fuel injection amount and progresses an aging deterioration of the injector 10. In such the case, a pressure drop amount ΔP shown in a waveform (c) in FIG. 2 is gradually decreased. On the other hand, wearing of the seat surfaces 11*e* and 12*a* may increase a fuel injection amount and progresses an aging deterioration of the injector 10. In such the case, a pressure drop amount ΔP shown in a waveform (c) in FIG. 2 is gradually increased. The pressure drop amount ΔP is an amount of descent of a detected pressure caused by an increase of injection rate. The pressure drop amount ΔP may correspond to an amount of pressure drop from the standard pressure Pbase to the inflection point P2, or an amount of pressure drop from the inflection point P1 to the inflection point P2.

The maximum injection rate Rmax in the large amount injection, i.e., the preset value Rγ, has high correlation with the pressure drop amount ΔP. The apparatus calculates and learns the preset value Rγ based on a detected result of the pressure drop amount ΔP. That is, a learnt value of the maximum injection rate Rmax in the large amount injection corresponds to a learnt value of the preset value Rγ which is learnt based on the pressure drop amount ΔP.

As described above, the injection rate parameters td, te, Rα, Rβ, and Rmax can be calculated from the pressure waveforms. In addition, it is possible to calculate the injection rate waveform (b) in FIG. 2 corresponding to the injection command signal (a) in FIG. 2 based on the learnt values of the injection rate parameters td, te, Rα, Rβ, and Rmax. Since an area of the injection rate waveform calculated in this way, shown by dots on the waveform (b) in FIG. 2, is equivalent to a fuel injection amount. Therefore, it is also possible to calculate a fuel injection amount based on the injection rate parameters.

Figure 3:
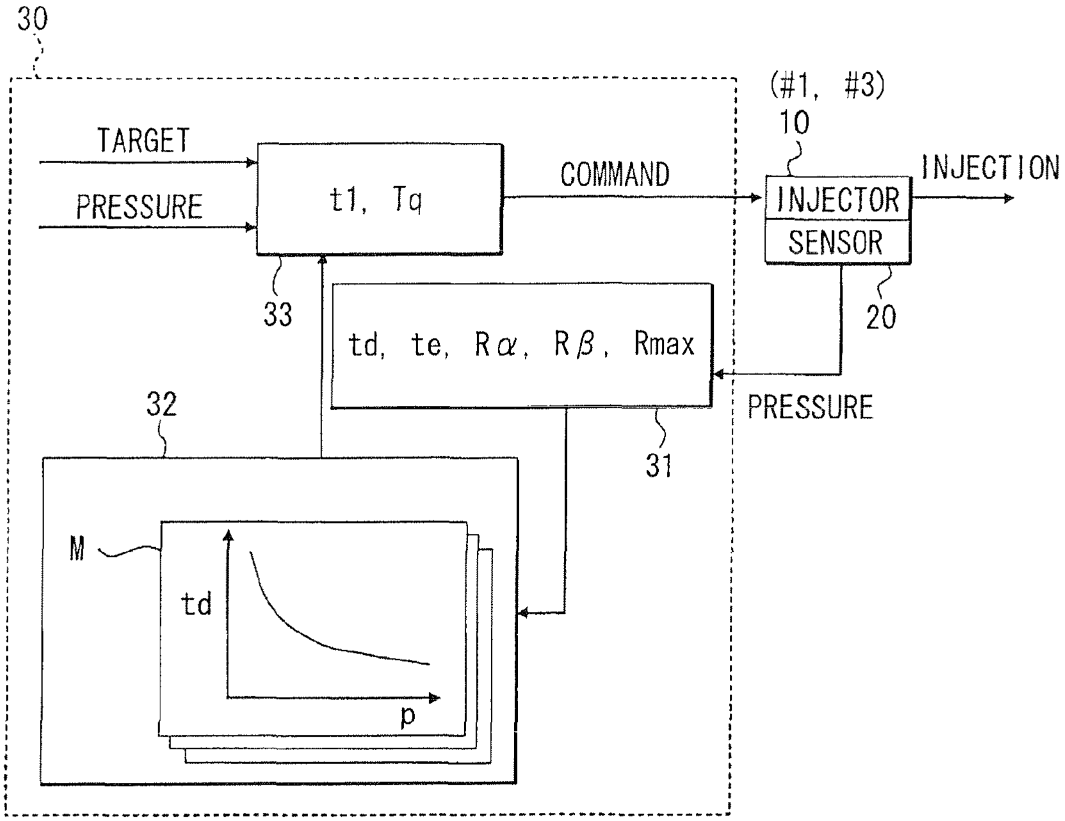
FIG. 3 is a diagram showing a control module for injectors for cylinders #1 and #3 which have fuel pressure sensors respectively.

FIG. 3 is a block diagram showing outlines, such as setting of the injection command signal to the injectors 10 for the cylinders #1 and #3, and learning of the injection rate parameters. The ECU 30, i.e., the apparatus, provides a plurality of sections 31, 32, and 33 which performs predetermined function by a computer and computer readable program stored in a memory device. The injection rate parameter calculation section 31 calculates the injection rate parameters td, te, Rα, Rβ, and Rmax based on the fuel pressure waveforms detected by the fuel pressure sensors 20.

The learning section 32 learns the injection rate parameters calculated by the injection rate parameter calculation section 31. The learning section 32 stores and renewals the injection rate parameters in a memory device in the ECU 30. The injection rate parameters may take different value according to supplied pressure of fuel at each time. The supplied pressure may be a pressure in the common rail 42. Therefore, it is desirable to learn the injection rate parameters in a manner that the injection rate parameters are associated with the supplied pressure or the standard pressure Pbase. The standard pressure Pbase is shown on the waveform (c) in FIG. 2 and explained later. In the example of FIG. 3, values of the injection rate parameters associated with the fuel pressure are stored in the injection rate parameter map M. The injection rate parameter map M may be arranged in a form of a look up table. FIG. 3 shows an example of the map M for the delay time td in which the delay time td is expressed as a function of the fuel pressure "p".

The setting section 33 acquires the injection rate parameters, i.e., the learnt value, corresponding to a present fuel pressure from the injection rate parameter map M. The setting section 33 may be referred to as a control section. The setting section 33 calculates and outputs the injection command signal defined by at least the start timing t1 and the injection period Tq based on the target injection state, the fuel pressure, and the learnt value of the injection rate parameters. The setting section 33 sets the injection command signal defined by t1, t2, and Tq corresponding to the target injection state based on the acquired injection rate parameters. The ECU 30 operates the injector 10 according to the injection command signal. The ECU 30 uses the fuel pressure sensor 20 to acquire the fuel pressure waveform caused by the operation of the injector 10. Then, the ECU 30 again learns the injection rate parameters td, te, Rα, Rβ, and Rmax. The injection rate parameters td, te, Rα, Rβ, and Rmax are calculated by the injection rate parameter calculation section 31 based on the fuel pressure waveforms.

That is, the apparatus detects and learns an actual injection state caused by an injection command signal in the past, and sets and adjusts the injection command signal in the future based on the learnt values in order to achieve the target injection state. The injection command signal is set and adjusted by a feedback control method based on the actual injection state. Therefore, even if aging deterioration progresses, it is possible to control the fuel injection state with high accuracy so that the actual injection state approaches to the target injection state.

In this embodiment, a feedback control for the injection command signal is performed to adjust the period Tq based on the injection rate parameters so that the actual fuel injection amount approaches to and equal to a target fuel injection amount. In other words, the apparatus compensates the injection command signal to adjust the actual fuel injection amount to the target fuel injection amount.

Figure 4:
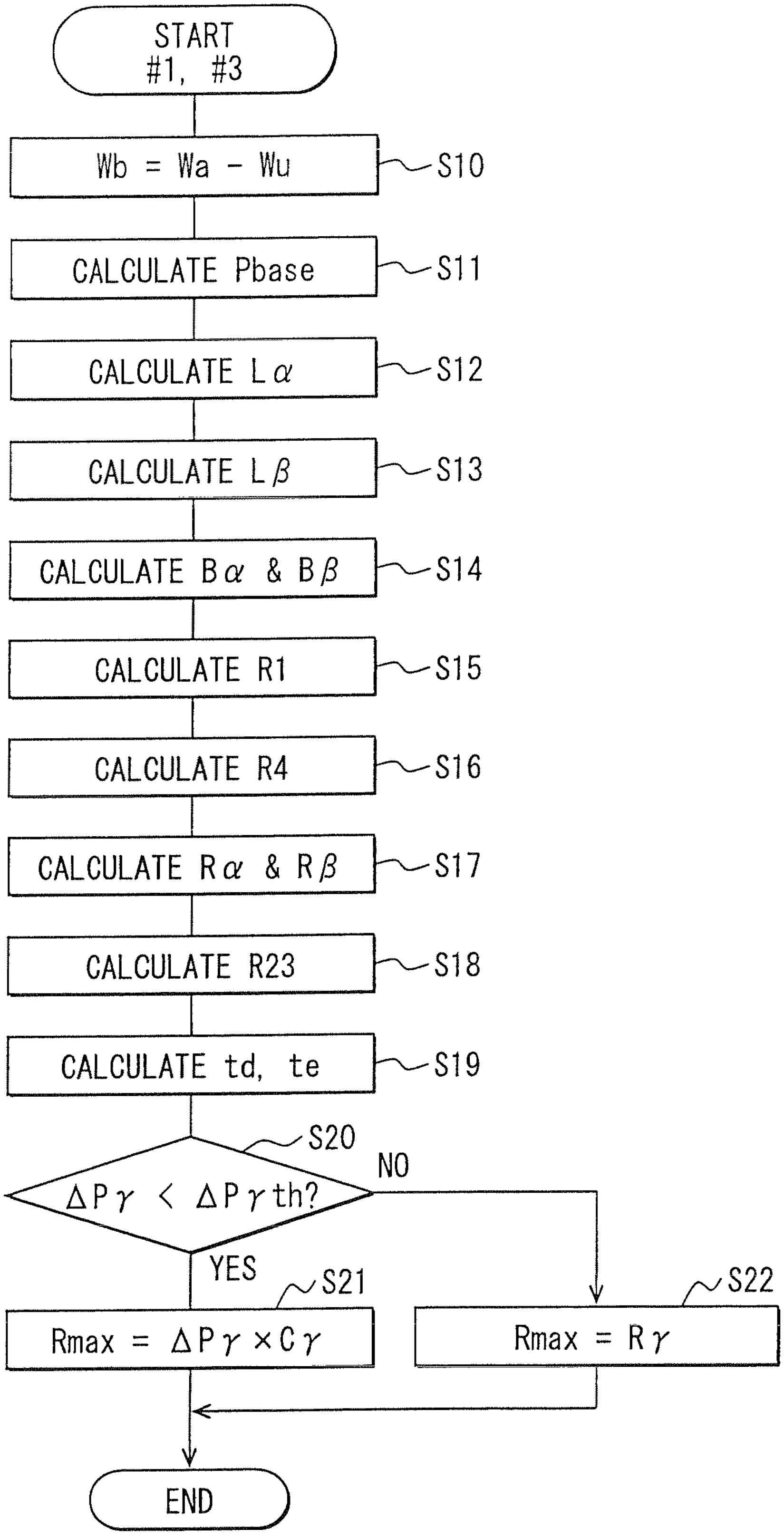
FIG. 4 is a flow chart for calculating injection rate parameters.

Processing for calculating the injection rate parameters td, te, Rα, Rβ, and Rmax from the detected fuel pressure waveforms is explained referring to FIG. 4. Processing shown in FIG. 4 is performed by a microcomputer in the ECU 30 in response to a single fuel injection carried out by the injectors 10 for the cylinders #1 and #3. The fuel pressure waveform is shown in a discrete form of data that is a set of detected values of the fuel pressure sensor 20 sampled with a predetermined sampling period.

In step S10 shown in FIG. 4, the ECU 30 calculates an injection waveform Wb. The injection waveform Wb is used to calculate injection rate parameters. The injection waveform Wb may also be referred to as a corrected waveform. In the following description, a cylinder to which fuel is injected from an injector 10 is referred to as an injected cylinder or an active cylinder. A cylinder to which no fuel is injected is referred to as a non-injected cylinder or an inactive cylinder. The non-injected cylinder is not supplied with fuel when the injected cylinder is supplied with fuel. A fuel pressure sensor 20 corresponding to the injected cylinder may be referred to as an injected pressure sensor. A fuel pressure sensor 20 corresponding to the non-injected cylinder may be referred to as an non-injected pressure sensor.

Figure 5:
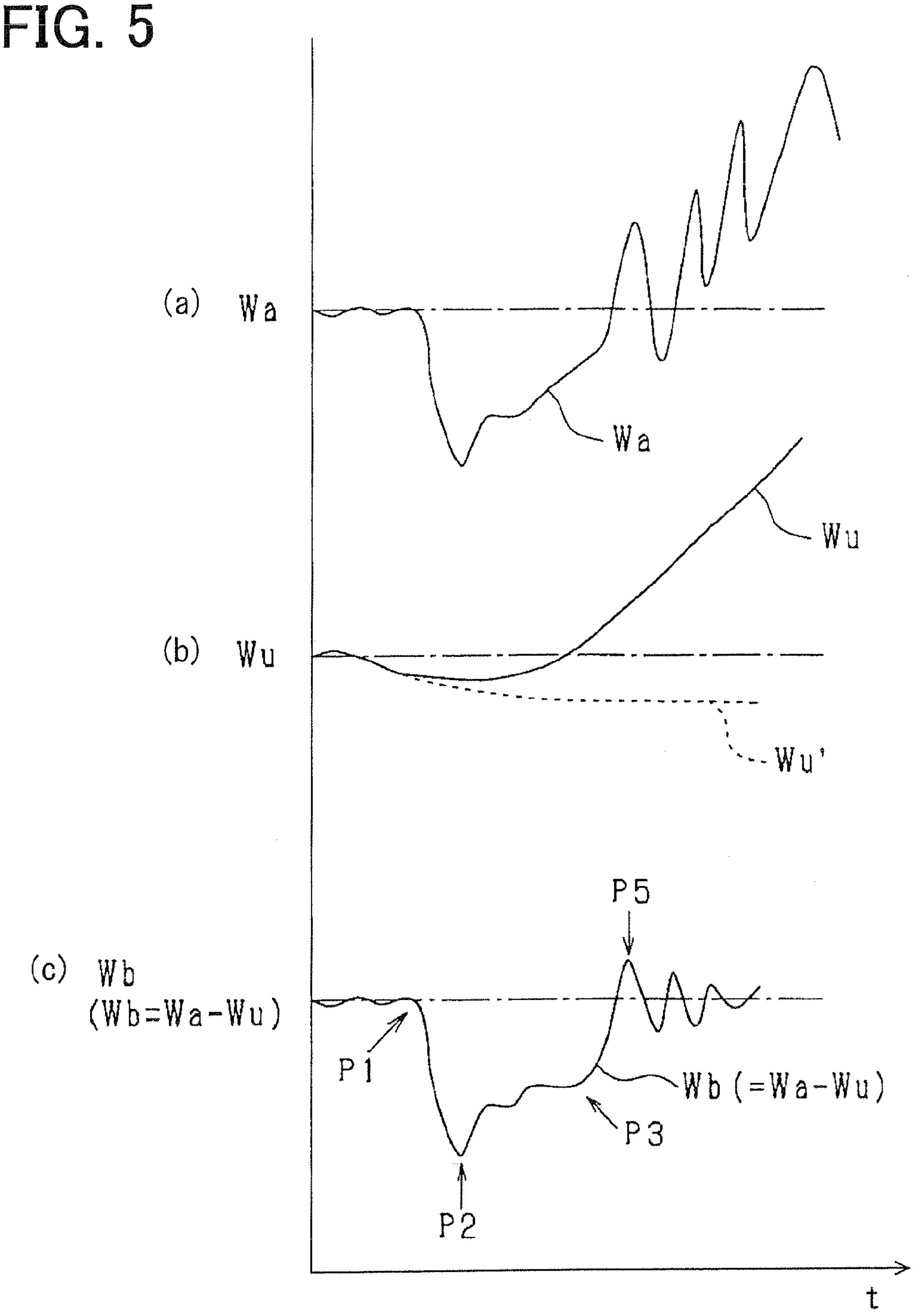
FIG. 5 is a timing diagram showing waveforms of fuel pressure.

In FIG. 5, a waveform (a) shows a composite waveform Wa, waveforms (b) show background waveforms Wu and Wu', and a waveform (c) shows an injection waveform Wb. The composite waveform Wa is a pressure waveform detected by a fuel pressure sensor provided for a cylinder to which fuel injection is performed. The composite waveform Wa includes not only components caused by influences of an injection but also components caused by the other influences other than the injection. The other influences may include the following examples. For example, the composite waveform Wa may reflect an operation of the fuel pump 41. The system may include the fuel pump 41 which pressurizes and feeds fuel in the fuel tank 40 to the common rail 42 and intermittently pressurizes fuel by using a mechanism like a plunger pump. In this case, if pumping is performed during fuel injection, the composite waveform Wa in the pumping period may show higher pressure. In other words, the composite waveform Wa includes at least a component corresponding to the injection waveform Wb showing pressure change purely caused by an injection and a component corresponding to the background waveform Wu showing pressure increase caused by a pumping operation of the fuel pump 41.

If the pumping operation is not performed during an injection, fuel pressure in the injection system drops by an amount of injected fuel in a period just after the fuel injection. Therefore, the composite waveform Wa in an injection period shows a waveform that is relatively low for the injection period. In other words, the composite waveform Wa includes a component corresponding to the injection waveform Wb showing pressure change purely caused by an injection and a component corresponding to a background waveform Wu' showing pressure drop caused by no pumping operation of the fuel pump.

The background waveform Wu and the background waveform Wu' may be observed and detected in a period when no injection is performed. In other words, the background waveform Wu and the background waveform Wu' may be detected by the pressure sensor disposed on a cylinder for which no injection is performed. The background waveform Wu and Wu' show pressure change in the common rail, i.e., pressure change of whole system. In step S10 in FIG. 4, the ECU 30 calculates the injection waveform Wb by subtracting the background waveform Wu (Wu') from the composite waveform Wa. The background waveform Wu (Wu') is detected by the pressure sensor 20 for the non-injected cylinder. The composite waveform Wa is detected by the pressure sensor 20 for the injected cylinder. The waveform of fuel pressure shown in FIG. 2 is the injection waveform Wb.

In a case that a multi-stage injection is performed, a leading stage injection causes pulsations after the leading stage injection. In some cases, such pulsations shall be considered to calculate the injection waveform Wb. In FIG. 2, a pulsation waveform Wc, which shows pulsations caused by a leading stage injection, is superposed on the composite waveform Wa. Especially, in a case that an interval between a leading stage injection and a trailing stage injection is short, the composite waveform Wa is greatly affected by the pulsation waveform Wc. In order to reduce the influence of the pulsation waveform Wc, it is desirable to calculate the injection waveform Wb by subtracting the pulsation waveform Wc from the composite waveform Wa in addition to the background waveform Wu (Wu').

In step S11, the apparatus calculates an average fuel pressure of a standard waveform as a standard pressure Pbase. The standard waveform is a part of the injection waveform Wb corresponding to a period until the fuel pressure starts dropping in response to a beginning of injection. Step S11 may be referred to as a standard pressure calculation section which calculates the standard pressure based on the injection waveform Wb. For example, a part of the injection waveform Wb corresponding to a period TA until a predetermined time is elapsed from the start timing t1 may be set as the standard waveform. Alternatively, a part of the injection waveform Wb corresponding to a period from the start timing t1 to a timing before the inflection point P1 by a predetermined time may be set as the standard waveform. The inflection point P1 may be calculated based on differentiated values of a descending part of the injection waveform Wb.

In step S12, the apparatus calculates an approximation straight-line Lα of a descending waveform of the injection waveform Wb. The descending waveform of the injection waveform Wb corresponds to a period where fuel pressure descends as the injection rate increases. Step S12 provides a straight line approximation section which calculates the approximation straight-line Lα. For example, a part of the injection waveform Wb corresponding to a period TB from a timing where a predetermined time is elapsed from the start timing t1 may be set as the descending waveform. Alternatively, a part of the injection waveform Wb corresponding to a period between an inflection point P1 and an inflection point P2 may be set as the descending waveform. The inflection points P1 and P2 may be calculated based on differentiated values of a descending part of the injection waveform Wb. The approximation straight-line Lα may be calculated based on a plurality of detected values, i.e., discrete sample values, of fuel pressure forming the descending waveform by using the least square method. Alternatively, the apparatus may calculate a tangential line at a point where a differentiation value of the descending waveform becomes minimum, and may set the tangential line as the approximation straight-line Lα.

In step S13, the apparatus calculates an approximation straight-line Lβ of an ascending part of the injection waveform Wb. The ascending part of the injection waveform Wb corresponds to a period where fuel pressure ascends as the injection rate decreases. Step S13 provides a straight line approximation section which calculates the approximation straight-line Lβ. For example, a part of the injection waveform Wb corresponding to a period TC from a timing where a predetermined time is elapsed from the finish timing t2 may be set as the ascending waveform. Alternatively, a part of the injection waveform Wb corresponding to a period between an inflection point P3 and an inflection point P5 may be set as the ascending waveform. The inflection points P3 and P5 may be calculated based on differentiated values of an ascending part of the injection waveform Wb. The approximation straight-line Lβ may be calculated based on a plurality of detected values, i.e., discrete sample values, of fuel pressure forming the ascending waveform by using the least square method. Alternatively, the apparatus may calculate a tangential line at a point where a differentiation value of the ascending waveform becomes maximum, and may set the tangential line as the approximation straight-line Lβ.

In step S14, the apparatus calculates reference values Bα and Bβ based on the standard pressure Pbase. For example, the reference values Bα and Bβ may be calculated to have values lower than the standard pressure Pbase by a predetermined value. It is not necessary to set both reference values Bα and Bβ as the same value. The predetermined value may be set in a variable manner in accordance with operating condition of the fuel injection system, such as the standard pressure Pbase and a temperature of fuel.

In step S15, the apparatus calculates a timing where the approximation straight-line Lα reaches to the reference value Bα. The timing is defined as a crossing timing LBα where the line Lα crosses the level Bα. The start timing R1 of fuel injection has high correlation with the crossing timing LBα. The apparatus calculates the start timing R1 of fuel injection based on the crossing timing LBα. For example, the apparatus may be configured to calculate the injection start timing R1 by calculating a timing before the crossing timing LBα by a predetermined delay time Cα.

In step S16, the apparatus calculates a timing where the approximation straight-line Lβ reaches to the reference value Bβ. The timing is defined as a crossing timing Lβ where the line Lβ crosses the level Bβ. The finish timing R4 of fuel injection has high correlation with the crossing timing LBβ. The apparatus calculates the finish timing R4 of fuel injection based on the crossing timing LBβ. For example, the apparatus may be configured to calculate the injection finish timing R4 by calculating a timing before the crossing timing LBβ by a predetermined delay time Cβ. The delay times Cα and Cβ may be set in a variable manner in accordance with operating condition of the fuel injection system, such as the standard pressure Pbase and a temperature of fuel.

An inclination of the approximation straight-line Lα has high correlation with an inclination of increasing part of fuel injection rate. In step S17, the apparatus calculates an inclination of the line Rα based on the approximation straight-line Lα. The line Rα shows increase of fuel injection rate as shown in the waveform (b) in FIG. 2. For example, the inclination of the line Rα may be calculated by multiplying inclination of Lα by a predetermined coefficient. The straight line Rα may be defined based on the injection start timing R1 calculated in the step S15 and the inclination of the line Rα calculated in the step S17.

An inclination of the approximation straight-line Lβ has high correlation with an inclination of decreasing part of fuel injection which is shown by a line Rβ on the waveform (b) in FIG. 2. In step S17, the apparatus calculates the inclination of the line Rβ based on the approximation straight-line Lβ. For example, the inclination of the line Rβ may be calculated by multiplying inclination of Lβ by a predetermined coefficient. The straight line Rβ may be defined based on the injection finish timing R4 calculated in the step S16 and the inclination of the line Rβ calculated in the step S17. The predetermined coefficient may be set in a variable manner in accordance with operating condition of the fuel injection system, such as the standard pressure Pbase and a temperature of fuel.

In step S18, the apparatus calculates a timing, i.e., the valve closure start timing R23, where the valve member 12 begins downward motion in response to the trailing edge of the injection command signal based on the lines Rα and Rβ calculated in the step S17. In detail, the apparatus calculates a crossing point of the lines Rα and Rβ, and calculates a crossing timing of the lines Rα and Rβ as the valve closure start timing R23.

In step S19, the apparatus calculates the injection start delay time td of the start timing R1 of fuel injection with respect to the corresponding start timing t1 of the command signal. In addition, the apparatus calculates a delay time, i.e., the injection finish delay time te, of the valve closure start timing R23 calculated in the step S18 with respect to the finish timing t2 of the injection command signal. The injection finish delay time te corresponds to a period of time between the finish timing t2 where finish of injection is commanded and a timing where the control valve 14 actually begins operation. The delay times td and te are the parameters showing the response delay of injection rate change with respect to the injection command signal. The response delay may be shown by other parameters, such as a delay time from the command start timing t1 to the timing R2 where injection rate reaches to the maximum, a delay time from the injection finish timing t2 to a drop start timing R3 of injection rate, and a delay time from the injection finish timing t2 to the injection finish timing R4.

In step S20, the apparatus determines whether the pressure difference $\Delta P\gamma$ between the standard pressure Pbase and the crossing pressure $P\alpha\beta$ is less than the predetermined amount $\Delta P\gamma th$ ($\Delta P\gamma < \Delta P\gamma th$) or not. If it is determined that $\Delta P\gamma < \Delta P\gamma th$ is affirmative, the routine proceeds to step S21, i.e., branches to YES from the step S20. In step S21, it is assumed that the injection was the small amount injection, the apparatus calculates the maximum injection rate Rmax based on the pressure difference $\Delta P\gamma$ by: $Rmax = \Delta P\gamma \times C\gamma$. The step S21 provides a maximum injection rate calculation section. On the other hand, if it is determined that it is $\Delta P\gamma >= \Delta P\gamma th$, the routine proceeds to step S22, i.e., branches to NO from the step S20. In step S22, the apparatus calculates the maximum injection rate Rmax by setting the predetermined value Ry as the maximum injection rate Rmax. The step S22 also provides the maximum injection rate calculation section.

In the above description, a method for controlling fuel injection of the injectors 10 which have the pressure sensors 20, i.e., the injectors 10 for the cylinders #1 and #3, are described referring to FIG. 2 to FIG. 5. A method for controlling the injectors 10 which has no pressure sensors 20, i.e., the injectors 10 for the cylinders #4 and #2, are described by using FIG. 6 to FIG. 11.

Figure 6:
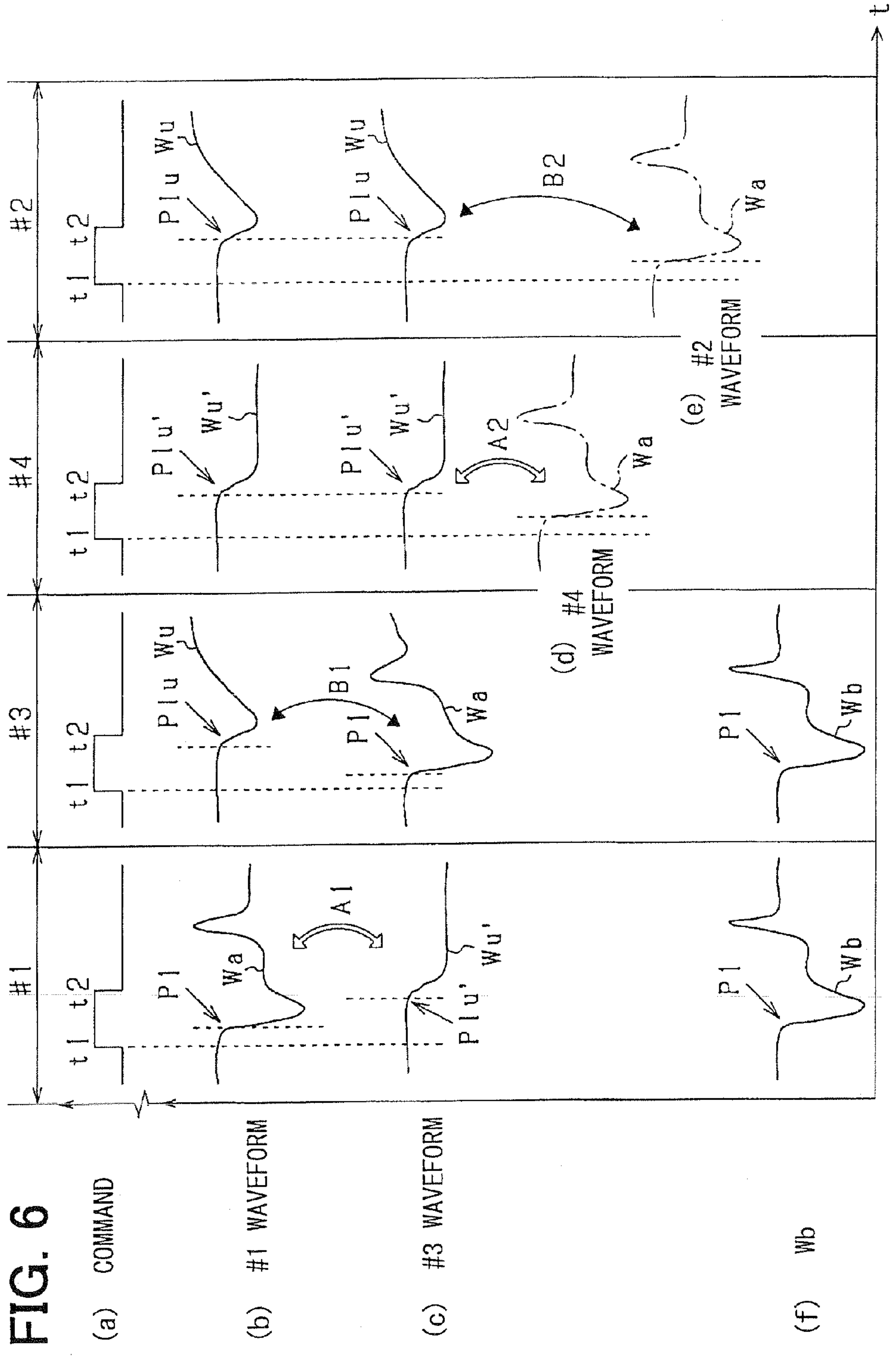
FIG. 6 is a timing diagram, which is used to explain a method for estimating fuel injection state of an injector which does not include a pressure sensor, showing combinations of waveforms in each cylinder.

Fuel injection by the injectors 10 is performed in an order of #1, #3, #4, and #2. In FIG. 6, waveforms (a) show command signals for the injectors 10 for the cylinders #1, #3, #4, and #2. The command signals are sequentially supplied to the injectors 10 from the left column. In FIG. 6, waveforms (b) show pressure waveforms detected by the fuel pressure sensor 20 provided in the injector 10 for the cylinder #1. The waveform may be referred to as a detected waveform or a #1 waveform. The #1 waveform in each column shows pressure change that is detected when fuel injection is carried out to the cylinder shown on the top. In FIG. 6, waveforms (c) show pressure waveforms detected by the fuel pressure sensor 20 provided in the injector 10 for the cylinder #3. The waveform may be referred to as a detected waveform or a #3 waveform. The #3 waveform in each column shows pressure change that is detected when fuel injection is carried out to the cylinder shown on the top.

In FIG. 6, waveforms (d) show pressure waveform in the injector 10 for the cylinder #4 when fuel injection is carried out to the cylinder #4. The waveform may be referred to as a #4 waveform. Since the injector 10 has no pressure sensor 20, the #4 waveform can not be directly detected. The #4 waveform may be referred to as a non-detectable waveform. In FIG. 6, waveforms (e) show pressure waveform in the injector 10 for the cylinder #2 when fuel injection is carried out to the cylinder #2. The waveform may be referred to as a #2 waveform. Since the injector 10 has no pressure sensor 20, the #2 waveform can not be directly detected. The #2 waveform may be referred to as a non-detectable waveform.

In FIG. 6, waveforms (f) show the injection waveform Wb. The injection waveform Wb shows a difference between the #1 waveform and the #3 waveform when fuel injection is performed for the cylinder #1. In other words, the injection waveform Wb shows a difference between the composite waveform Wa and the background waveform Wu or Wu'. The injection waveform Wb can be calculated by subtracting a waveform Wu or Wu' detected by the pressure sensor 20 provided for the cylinder to which fuel injection is not performed from a waveform Wa detected by the pressure sensor 20 provided for the cylinder to which fuel injection is performed.

For example, the injection waveform Wb in the most left column is calculated by subtracting the #3 waveform, i.e., the background waveform Wu' from the #1 waveform, i.e., the composite waveform Wa. The injection waveform Wb in the most left column is calculated by subtracting the #3 waveform when fuel injection is performed for the cylinder #1 from the #1 waveform when fuel injection is performed for the cylinder #1. The injection waveform Wb in the second column from left is calculated by subtracting the #1 waveform, i.e., the background waveform Wu from the #3 waveform, i.e., the composite waveform Wa. The injection waveform Wb in the second column is calculated by subtracting the #1 waveform when fuel injection is performed for the cylinder #3 from the #3 waveform when fuel injection is performed for the cylinder #3.

In this embodiment, the fuel pump 41 pressurizes fuel twice per one combustion cycle. In this embodiment, as shown in FIG. 6, a period of pressurizing fuel by the fuel pump 41 overlaps with a period of injecting fuel from the injector 10 for the cylinders #3 and #2. Therefore, the periods indicated by the reference symbols #3 and #2 correspond to pressurizing periods respectively. The periods indicated by the reference symbols #1 and #4 correspond to non-pressurizing periods respectively. The #3 waveform in an injection for the cylinder #1 corresponds to the waveform Wu' shown in a broken line in FIG. 5, i.e., the background waveform Wu'. The #1 waveform in an injection for the cylinder #3 corresponds to the waveform Wu shown in a solid line in FIG. 5, i.e., the background waveform Wu.

In the column of the injection for the cylinder #1 in FIG. 6, the #1 waveform is the composite waveform Wa at the non-pressurizing period, and the #3 waveform is the background waveform Wu' at the non-pressurizing period. The waveform Wa or Wb in the injection for the cylinder #1 has a correlation with the waveform Wu'. The correlation is shown by a reference A1. In addition, in the column of the injection for the cylinder #4 in FIG. 6, the #1 waveform or the #3 waveform is the background waveform Wu' at the non-pressurizing period, and the #4 waveform, which is not detectable, is the composite waveform Wa at the non-pressurizing period. The waveform Wa or Wb in the injection for the cylinder #4 has a correlation with the waveform Wu'. The correlation is shown by a reference A2. The correlation A1 in the injection for the cylinder #1 and the correlation A2 in the injection for the cylinder #4 closely coincide with each other.

Base on the coincidence between the correlations A1 and A2, the apparatus is designed to include sections to perform a method including the following steps. In the method, the apparatus detects the #1 waveform in the injection for the cylinder #1, i.e., the composite waveform Wa, and the #3 waveform in the injection for the cylinder #1, i.e., the background waveform Wu'. The apparatus calculates the correlation A1 between the #1 waveform and the #3 waveform. Then, the apparatus detects the #1 waveform in the injection for the cylinder #4 or the #3 waveform in the injection for the cylinder #4, i.e., the background waveform Wu'. Then the apparatus estimates injection state from the injector 10 for the cylinder #4, which corresponds to the #4 waveform in the injection for the cylinder #4 based on the #1 or #3 waveform, and the correlation A1. Since the #1 waveform and the #3 waveform are similar to each other in the injection for the cylinder #4, it is possible to use either the #1 waveform or the #3 waveform for the purpose of estimating the injection state for the cylinder #4.

Similar method is used in order to perform estimation of injection state in the pressurizing period, i.e., injection state of the cylinder #2. In the column of the injection for the cylinder #3 in FIG. 6, the #3 waveform is the composite waveform Wa at the pressurizing period, and the #1 waveform is the background waveform Wu at the pressurizing period. The waveform Wa or Wb in the injection for the cylinder #3 has a correlation with the waveform Wu. The correlation is shown by a reference B1. In addition, in the column of the injection for the cylinder #2 in FIG. 6, the #1 waveform or the #3 waveform is the background waveform Wu at the pressurizing period, and the #2 waveform, which is not detectable, is the composite waveform Wa at the pressurizing period. The waveform Wa or Wb in the injection for the cylinder #2 has a correlation with the waveform Wu. The correlation is shown by a reference B2. The correlation B1 in the injection for the cylinder #3 and the correlation B2 in the injection for the cylinder #2 closely coincide with each other.

Base on the coincidence between the correlations B1 and B2, the apparatus is designed to include sections to perform a method including the following steps. In the method, the apparatus detects the #3 waveform in the injection for the cylinder #3, i.e., the composite waveform Wa, and the #1 waveform in the injection for the cylinder #3, i.e., the background waveform Wu'. The apparatus calculates the correlation B1 between the #1 waveform and the #3 waveform. Then, the apparatus detects the #1 waveform in the injection for the cylinder #2 or the #3 waveform in the injection for the cylinder #2, i.e., the background waveform Wu'. Then the apparatus estimates injection state from the injector 10 for the cylinder #2, which corresponds to the #2 waveform in the injection for the cylinder #2 based on the #1 or #3 waveform and the correlation B1. Since the #1 waveform and the #3 waveform are similar to each other in the injection for the cylinder #2, it is possible to use either the #1 waveform or the #3 waveform for the purpose of estimating the injection state for the cylinder #2.

The #1 waveform in the injection for the cylinder #1 may also be referred to as an injected cylinder waveform Wa, Wb. The fuel pressure sensor 20 which detects the #1 waveform in the injection for the cylinder #1 may be referred to as a first fuel pressure sensor. The injector 10 for the cylinder #1 may be referred to as a first injector. The first injector includes the first fuel pressure sensor. The #3 waveform in the injection for the cylinder #1 may also be referred to as a first non-injected cylinder waveform Wu, Wu'. The fuel pressure sensor 20 which detects the #3 waveform in the injection for the cylinder #1 may be referred to as a second fuel pressure sensor. The injector 10 for the cylinder #3 may be referred to as a second injector. The second injector includes the second fuel pressure sensor. In the non-pressurizing period, the injector 10 for the cylinder #4 is an object injector of which injection state is to be estimated. The injector 10 for the cylinder #4 may be referred to as a third injector. The #1 waveform or the #3 waveform in the injection for the cylinder #4 may be referred to as a second non-injected cylinder waveform.

Similarly, the #3 waveform in the injection for the cylinder #3 may also be referred to as the injected cylinder waveform Wa, Wb. The fuel pressure sensor 20 which detects the #3 waveform in the injection for the cylinder #3 may be referred to as the first fuel pressure sensor. The injector 10 for the cylinder #3 may be referred to as the first injector. The #1 waveform in the injection for the cylinder #3 may also be referred to the non-injected cylinder waveform Wa, Wb. The fuel pressure sensor 20 which detects the #1 waveform in the injection for the cylinder #1 may be referred to as the second fuel pressure sensor. The injector 10 for the cylinder #1 may be referred to as the second injector. In the pressurizing period, the injector 10 for the cylinder #2 is an object injector of which injection state is to be estimated. The injector 10 for the cylinder #2 may be referred to as the third injector. The #1 waveform or the #3 waveform in the injection for the cylinder #2 may be referred to as the second non-injected cylinder waveform.

The apparatus provides a first acquisition section which acquires an injected cylinder waveform Wa, Wb, the injected cylinder waveform being shown by fuel pressure change detected by the first fuel pressure sensor when the first injector injects fuel. The apparatus provides a second acquisition section which acquires a first non-injected cylinder waveform Wu, Wu', the first non-injected cylinder waveform being shown by fuel pressure change detected by the second fuel pressure sensor when the first injector injects fuel. The apparatus provides a correlation calculation section which calculates a correlation Atd, AQ, Btd, BQ between the injected cylinder waveform Wa, Wb and the first non-injected cylinder waveform Wu, Wu'. The apparatus provides a third acquisition section which acquires a second non-injected cylinder waveform Wu, Wu', the second non-injected cylinder waveform being shown by fuel pressure change detected by the first or second fuel pressure sensor when the third injector #2, #4 injects fuel. The apparatus provides an injection state estimation section which estimates fuel injection state injected from the third injector #2, #4 based on the second non-injected cylinder waveform Wu, Wu' and the correlation Atd, AQ, Btd, BQ. The correlation calculation section distinguishes and calculates the correlation Atd, AQ, Btd, BQ in a distinguishable manner depending on whether the injected cylinder waveform Wa, Wb and the first and second non-injected cylinder waveform Wu, Wu' are detected in a pressurizing period or in a non-pressurizing period of the fuel pump 41. The injection state estimation section selects the correlation Atd, AQ, Btd, BQ to be used for estimation of the fuel injection state, according to whether the second non-injected cylinder waveform Wu, Wu' is detected at the pressurizing period or in the non-pressurizing period of the fuel pump 41.

Figure 7:
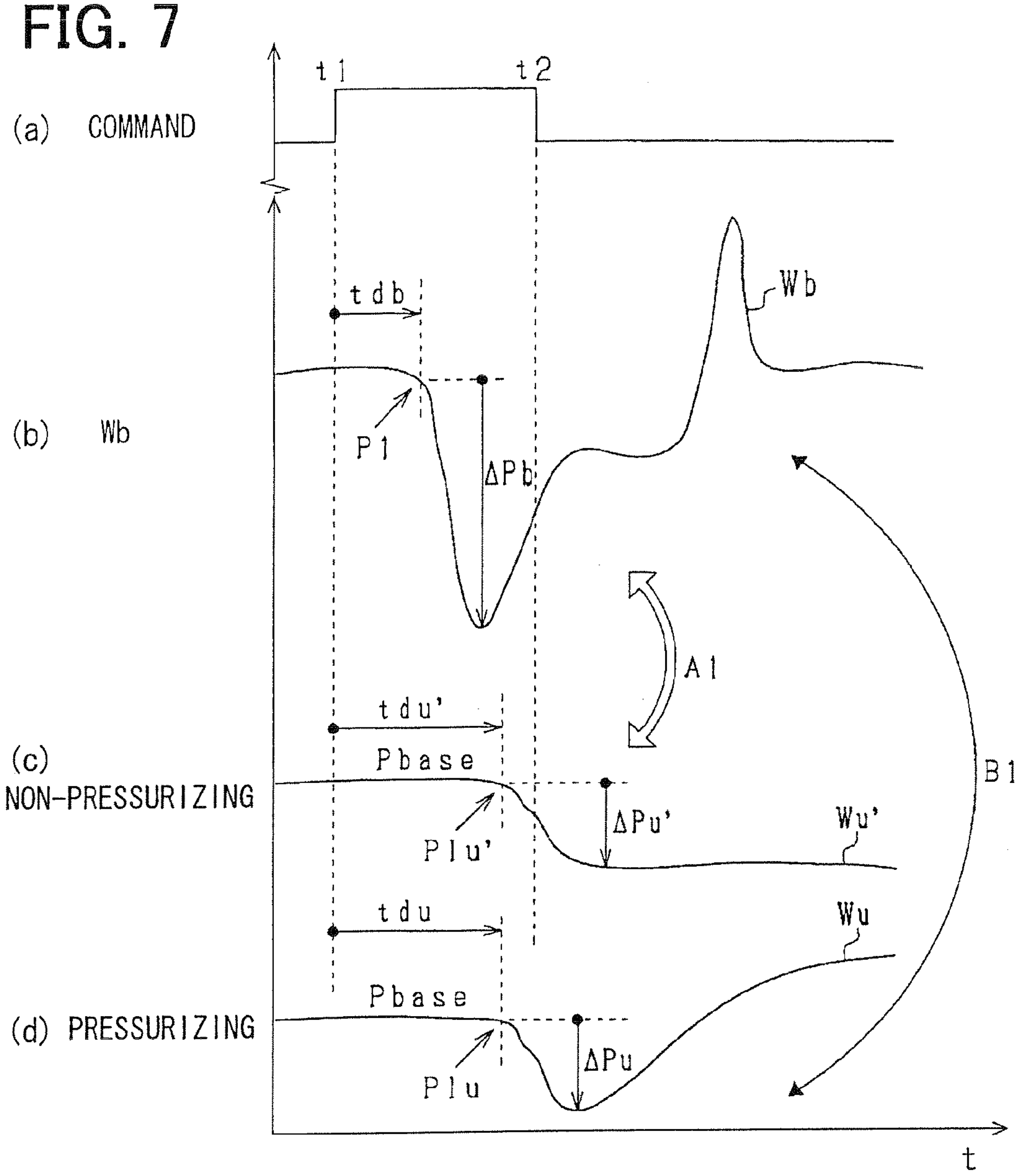
FIG. 7 is a timing diagram, which is used to show examples of correlations A1 and B1 shown in FIG. 6.

FIG. 7 is a timing diagram, which is used to explain examples of the correlations A1 and B1. In the example, correlation coefficients Atd and AQ are calculated as parameters showing the correlation A1. Correlation coefficients Btd and BQ are calculated as parameters showing the correlation B1. In FIG. 7, a waveform (a) shows an injection command signal. A waveform (b) shows the injection waveform Wb. A waveform (c) shows the background waveform Wu' when the fuel pump 41 is in the non-pressurizing period. A waveform (d) shows the background waveform Wu when the fuel pump 41 is in the pressurizing period.

In FIG. 7, a row (e) shows correlation coefficients Atd and Btd relating to delays on waveforms. As shown in the expressions, the correlation coefficients Atd and Btd can be provided as ratios between an injection pressure delay time tdb and drop delay times tdu and tdu' shown in FIG. 7. The correlation coefficient Atd may be expressed by: Atd=tdb/tdu'. The correlation coefficient Btd may be expressed by: Btd=tdb/tdu. The injection pressure delay time tdb is a period of time between a timing t1 and a timing where an inflection point P1 appears on the injection waveform Wb. The timing t1 is a start timing t1 of the command signal for initiating fuel injection. The inflection point P1 shows beginning of pressure drop. The inflection point is also shown in a waveform (c) in FIG. 2. The drop delay times tdu and tdu' are periods of time between the timing t1 and a timing where the background waveform Wu or Wu' begins dropping. In FIG. 7, timings P1*u*' and P1*u* show the timing where the background waveform Wu or Wu' begins dropping in response to fuel injection. Alternatively, it is possible to employ the following first modification. In the modification, the injection start delay time td may be used instead of the injection pressure delay time tdb. The injection start delay time td can be calculated as described in the step S19 in FIG. 4. In this modification, the correlation coefficients Atd and Btd may be expressed by: Atd=td/tdu', Btd=td/tdu.

In FIG. 7, a row (f) shows correlation coefficients AQ and BQ relating to fuel injection amounts on waveforms. As shown in the expressions, the correlation coefficients AQ and BQ can be provided as ratios between a fuel injection amount Q and a pressure drop amount ΔPu, ΔPu'. The correlation coefficients AQ and BQ may be expressed by: AQ=Q/ΔPu', BQ=Q/ΔPu. The fuel injection amount Q is an amount of injected fuel which can be calculated based on the parameters td, te, Rα, Rβ and Rmax calculated in the injection rate parameter calculation section 31. A pressure drop amount from a start timing P1*u*', P1*u* of pressure drop may be used as the pressure drop amount ΔPu, ΔPu'. A pressure drop amount with respect to an average pressure in a predetermined period just before the beginning of pressure drop may also be used as the pressure drop amount ΔPu, ΔPu'.

Alternatively, it is possible to employ the following second modification. In the modification, a pressure drop amount may be used instead of the fuel injection amount Q. A pressure drop amount ΔP from the inflection point P1 in the waveform Wb or Wa can be used as an alternative to the fuel injection amount Q. Similarly, a pressure drop amount ΔPb from the standard pressure Pbase can be used as an alternative to the fuel injection amount Q. In this modification, the correlation coefficients AQ and BQ may be expressed by: AQ=ΔPb/ΔPu', BQ=ΔPb/ΔPu. Alternatively, in a third modification, the maximum injection rate Rmax calculated in the steps S21 and S22 in FIG. 4 may be used as an alternative to the fuel injection amount Q. In this modification, the correlation coefficients AQ and BQ may be expressed by: AQ=Rmax/ΔPu', BQ=Rmax/ΔPu.

The learning section 32 learns the injection rate parameters td, te, Rα, Rβ, and Rmax by linking or associating the injection rate parameters with the standard pressure Pbase as described above. The values of the parameters differ in accordance with whether the injected waveform Wb, which is used to calculate the parameters, is detected in the pressurizing period or the non-pressurizing period of the fuel pump 41 as shown in lines (a) in FIG. 8. In order to compensate the difference of the parameters depending upon the operational phase of the fuel pump 41, the apparatus, i.e., the learning section 32, learns the injection rate parameters in a distinguishable manner depending on whether the fuel pump 41 is in the pressurizing period or in the non-pressurizing period.

Figure 8:
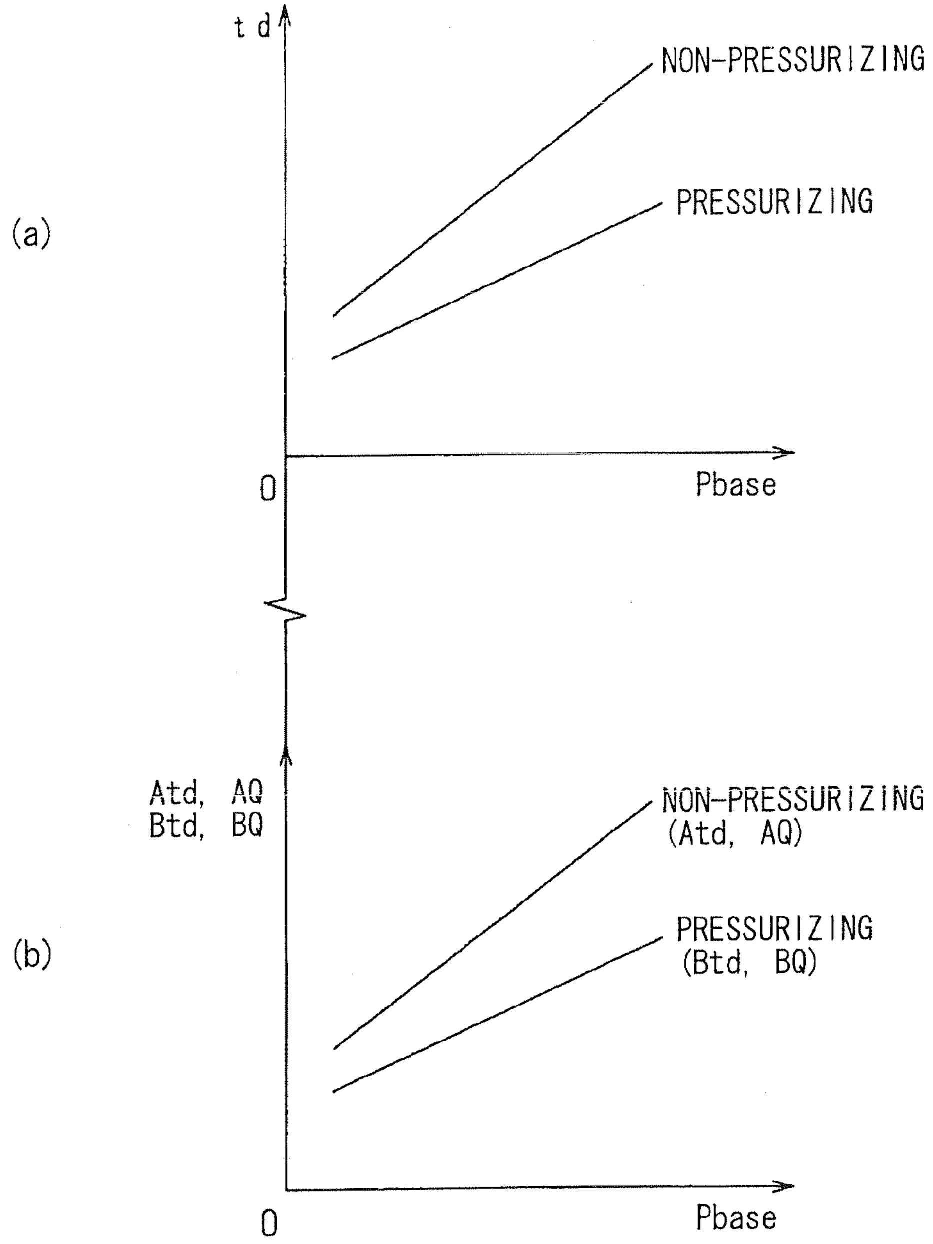
FIG. 8 is a diagram showing characteristics of an injection rate parameter and correlation coefficients with respect to a standard pressure and operation of a fuel pump.

The correlation coefficients Atd, AQ, Btd, and BQ also differ in accordance with whether the waveforms, which are used to calculate the correlation coefficients, are detected in the pressurizing period or the non-pressurizing period of the fuel pump 41 as shown in lines (b) in FIG. 8. In addition, the values of the correlation coefficients differ in accordance with the standard pressure Pbase on the waveforms used for calculation of the correlation coefficients. The apparatus is configured to compensate the difference of the correlation coefficients Atd, AQ, Btd, and BQ depending upon both the standard pressure Pbase, and the operational phase of the fuel pump 41. The apparatus calculates and learns the correlation coefficient Atd, AQ, Btd, and BQ by linking or associating the correlation coefficients with the standard pressure Pbase. The apparatus also calculates and learns the correlation coefficients Btd and BQ in the pressurizing period and the correlation coefficients Atd and BQ in the non-pressurizing period in a distinguishable manner.

Figure 9:
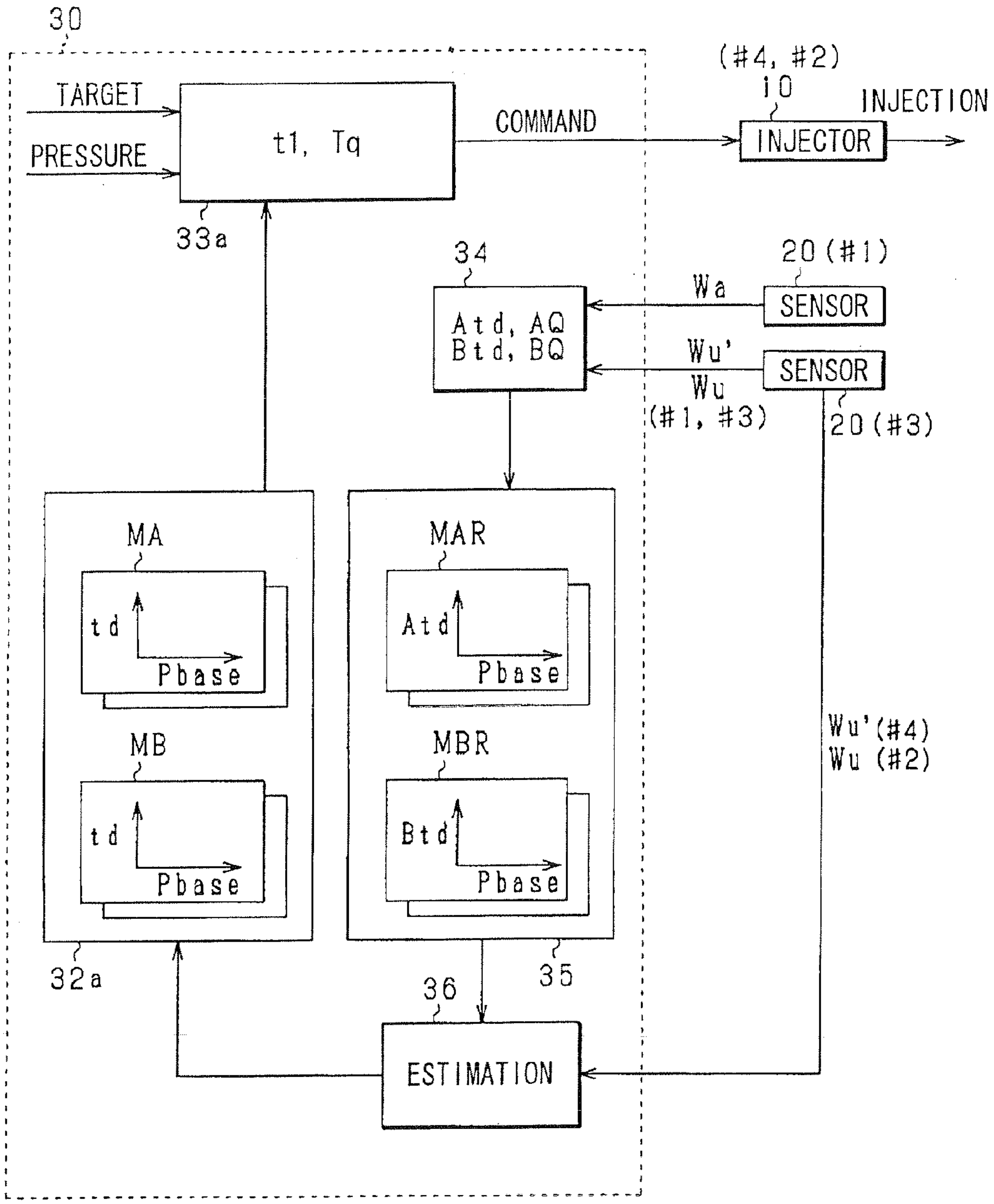
FIG. 9 is a diagram showing a control module for injectors #2 and #4 which does not have fuel pressure sensors respectively.

FIG. 9 is a block diagram showing outlines, such as setting of the injection command signal to the injectors 10 for the cylinders #4 and #2, and learning of the correlation coefficients Atd, AQ, Btd, and BQ. The ECU 30, i.e., the apparatus, provides a plurality of sections 34, 35, 36, 32*a* and 33*a* which performs predetermined function by a computer and computer readable program stored in a memory device.

A correlation calculation section 34 calculates the correlation coefficients Atd, AQ, Btd, and BQ based on the composite waveform Wa and the background waveforms Wu and Wu' which were detected by the fuel pressure sensors 20.

A correlation learning section 35 links or associates the calculated correlation coefficients Atd, AQ, Btd, and BQ with the standard pressure Pbase, and stores, i.e., learns, the correlation coefficients Atd, AQ, Btd, and BQ in correlation maps MAR and MBR. As a result, the correlation maps MAR and MBR provide a searchable database which can obtain the correlation coefficients Atd, AQ, Btd, and BQ based on the standard pressure Pbase. In addition, the correlation map MAR for the non-pressurizing period and the correlation map MBR for the pressurizing period are created independently. As a result, the correlation maps MAR and MBR provide a searchable database which can obtain the correlation coefficients Atd, AQ, Btd, and BQ based on the operational phase of the fuel pump 41. The correlation learning section 35 provides a storage section which stores the correlation calculated by the correlation calculation section. The storage section stores the correlation in a map in a manner that the correlation is associated with pressure just before the injected cylinder waveform starts dropping. In this arrangement, the correlation calculation section obtains the correlation to be used for the estimation based on pressure just before the second non-injected cylinder waveform starts dropping and the map. Detail of learning processing is later mentioned referring to FIG. 10.

An injection state estimation section 36 estimates the injection state from the injector 10 for the cylinder #4 based on the background waveform Wu' detected when the injector 10 for the cylinder #4 injects fuel and the correlation map MAR. In detail, the injection amount Q from the injector 10 for the cylinder #4 and the injection start delay time td are estimated as the injection state for the cylinder #4. Detail of estimation processing is later mentioned referring to FIG. 11.

In addition, the injection state estimation section 36 estimates the injection state from the injector 10 for the cylinder #2 based on the background waveform Wu detected when the injector 10 for the cylinder #2 injects fuel and the correlation map MBR. In detail, the injection amount Q from the injector 10 for the cylinder #2 and the injection start delay time td are estimated as the injection state for the cylinder #2.

A learning section 32*a* links or associates the estimated injection start delay time td with the standard pressure Pbase, and stores, i.e., learns, the injection start delay time td in estimated value maps MA and MB. As a result, the estimated value maps MA and MB provide a searchable database which can obtain the estimated injection state based on the standard pressure Pbase. In addition, the learning section 32*a* learns an injection amount rate Q/Tq, which is a rate of the injection amount Q and the injection period Tq, as the injection state indicative of the fuel injection amount Q. The learning section 32*a* links or associates the rate Q/Tq with the standard pressure Pbase and stores, i.e., learns, the rate Q/Tq in the estimated value maps MA and MB. In addition, the estimated value map MA for the non-pressurizing period and the estimated value map MB for the pressurizing period are created independently. As a result, the estimated value maps MA and MB provide a searchable database which can obtain the injection state based on the operational phase of the fuel pump 41.

The setting section 33 acquires the injection state, i.e., the learnt value, corresponding to a present value of fuel pressure from the estimated value maps MA and MB. The setting section 33*a* may be referred to as a control section. The setting section 33*a* acquires the injection start delay time td and injection amount rate Q/Tq as the injection state. The setting section 33 sets and outputs the injection command signal characterized by t1, t2, and Tq, which can provide the target injection state, based on the values td and Q/Tq. The ECU 30 operates the injector 10 according to the injection command signal. The ECU 30 uses the fuel pressure sensor 20 to acquire the fuel pressure waveform caused by the operation of the injector 10. Then, the ECU 30 again learns the correlation coefficients Atd, AQ, Btd, and BQ. Then, the ECU 30 again estimates and learns the injection state for the cylinder #4 and the injection state for the cylinder #2.

That is, the apparatus estimates and learns an actual injection state, i.e., the injection state for the cylinder #4 and the injection state for the cylinder #2, caused by an injection command signal in the past. Then, the apparatus sets and adjusts the injection command signal in the future based on the learnt values in order to achieve the target injection state. The injection command signal is set and adjusted by a feedback control method based on the actual injection state. Therefore, even if aging deterioration progresses, it is possible to control the fuel injection state with high accuracy so that the actual injection state approaches to the target injection state.

In this embodiment, a feedback control for the injection command signal is performed to adjust the period Tq based on the injection amount rate Q/Tq so that the actual fuel injection amount approaches to and equal to a target fuel injection amount. In other words, the apparatus compensates the injection command signal to adjust the actual fuel injection amount to the target fuel injection amount.

Figure 10:
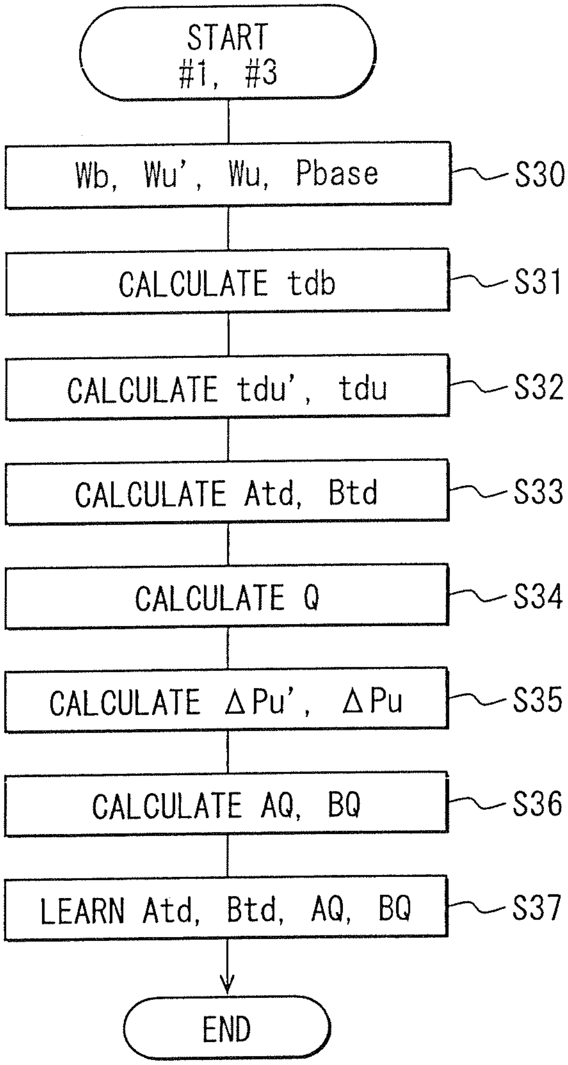
FIG. 10 a flow chart for calculating and learning correlation coefficients in corresponding sections in FIG. 9.

Processing for calculating and learning the correlation coefficients Atd, AQ, Btd, and BQ in the sections 34 and 35 is explained referring to FIG. 10. Processing shown in FIG. 10 is performed by the microcomputer in the ECU 30 in response to a single fuel injection carried out by the injectors 10 for the cylinders #1 and #3.

In step S30, the apparatus acquires the injection waveform Wb calculated in the step S10 and the non-injected waveforms Wu' and Wu. In addition, the apparatus acquires the standard pressure Pbase calculated in the step S11. As a result, the apparatus inputs the injection waveform Wb calculated from the #1 waveform and the #3 waveform, the non-injection waveforms Wu' and Wu, and the standard pressure Pbase in each event of injection for the cylinders #1 and #3.

In step S31, the apparatus calculates the injection pressure delay time tdb based on the acquired injection waveform Wb. The injection pressure delay time tdb is calculated as the first injection delay time. This step provides an injection delay time calculation section. The injection delay calculation section calculates the first injection delay time tdb, td showing a response delay of injection state with respect to an injection start command signal to the first injector based on the injected cylinder waveform Wa, Wb. In step S32, the apparatus calculates the drop delay times tdu' and tdu based on the acquired background waveforms Wu' and Wu. The step S32 provides a first drop delay calculation section which calculates a first drop delay time tdu, tdu' until the first non-injected cylinder waveform Wu, Wu' begins dropping from the injection start command signal to the first injector for the cylinder #1, #3. In step S33, the correlation coefficients Atd and Btd relating to the delay are calculated by: Atd=tdb/tdu', and Btd=tdb/tdu. The step S33 provides a correlation calculation section which calculates the correlation between the first injection delay time and the first drop delay time.

In step S34, the apparatus acquires the fuel injection amount Q calculated based on the injection rate parameters relating to the injection waveform Wb. The step S34 provides an injected waveform change calculation section which calculates a waveform change amount of the injected cylinder #1, #3. The waveform change amount of the injected cylinder may be shown by a fuel injection amount from the first injector calculated based on the injected cylinder waveform Wa, Wb. The fuel injection amount may be calculated based on an integrated value of the injected cylinder waveform Wa, Wb, or a pressure drop amount of the injected cylinder waveform Wa, Wb. In step S35, the apparatus calculates the pressure drop amount ΔPu and ΔPu' based on the background waveforms Wu' and Wu. The step 35 provides a first non-injected waveform change calculation section which calculates a first waveform change amount of the non-injected cylinder #3, #1. The first waveform change amount of the non-injected cylinder may be shown by an integrated value of the non-injected cylinder waveform Wu, Wu', or a pressure drop amount of the non-injected cylinder waveform Wu, Wu'. In step S36, the apparatus calculates the correlation coefficients AQ and BQ about the fuel injection amount by: AQ=Q/ΔPu', BQ=Q/ΔPu. The step S36 provides a correlation calculation section which calculates the correlation AQ, BQ between the waveform change amount of the injected cylinder and the first waveform change amount of the non-injected cylinder.

In step S37, the apparatus learns the correlation coefficients Atd, Btd, AQ, and BQ calculated in the steps S33 and S36 by storing the coefficients into the correlation maps MAR and MBR in an associated manner with the standard pressure Pbase acquired in the step S30. The correlation coefficients Btd and BQ are observed when the injection and the pressurizing period overlap each other, i.e., the injection for the cylinder #3. Therefore, the correlation coefficients Btd and BQ are stored in the correlation map MBR. The correlation coefficients Atd and AQ are observed when the injection and the pressurizing period do not overlap each other, i.e., the injection for the cylinder #1. Therefore, the correlation coefficients Atd and AQ are stored in the correlation map MAR.

Figure 11:
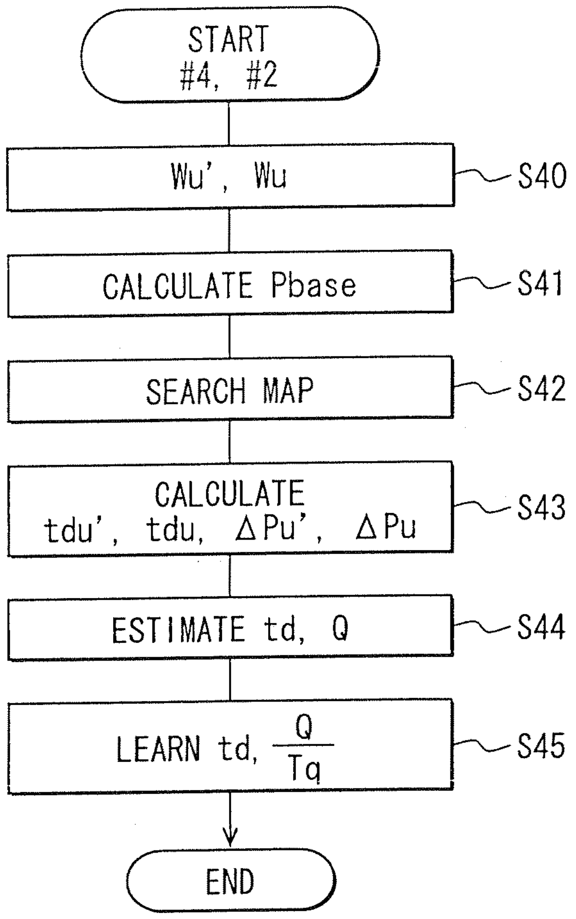
FIG. 11 is a flow chart for estimating injection state corresponding to the diagram in FIG. 9.

Processing for estimating and learning the injection start delay time td and an injection amount rate Q/Tq in the sections 36 and 32*a* is explained referring to FIG. 11. Processing shown in FIG. 11 is performed by the microcomputer in the ECU 30 in response to a single fuel injection carried out by the injectors 10 for the cylinders #4 and #2.

In step S40, the apparatus acquires the background waveforms Wu' and Wu. As a result, the apparatus inputs the background waveforms Wu' and Wu, and the standard pressure Pbase in each event of injection for the cylinders #4 and #2.

In step S41, the apparatus calculates a pressure just before the non-injected cylinder waveform starts dropping based on the background waveforms Wu' and Wu acquired in the step S40 as the standard pressure Pbase. In a step S41, the apparatus calculates an average fuel pressure of a standard waveform as a standard pressure Pbase. The standard waveform is a part of the background waveform corresponding to a period until the fuel pressure starts dropping in response to a beginning of injection. Step S41 may be referred to as a standard pressure calculation section which calculates the standard pressure based on the background waveform. For example, a part of the background waveform corresponding to a period TA until a predetermined time is elapsed from the start timing t1 may be set as the standard waveform. Alternatively, a part of the background waveform corresponding to a period from the start timing t1 to a timing before the start timing P1*u*', P1*u* of pressure drop by a predetermined time may be set as the standard waveform.

In step S42, the correlation coefficients Atd, AQ, Btd, and BQ corresponding to the standard pressure Pbase calculated in the step S41 is calculated by searching the correlation maps MAR and MBR. In step S43, the drop delay time tdu', tdu and the pressure drop amount ΔPu, ΔPu' are calculated based on the non injection waveform Wu', Wu acquired in the step S40. The step S43 provides a second drop delay calculation section which calculates a second drop delay time tdu, tdu' until the second non-injected cylinder waveform Wu, Wu' begins dropping from the injection start command signal to the third injector for the cylinder #2, #4. The step S43 also provides a second non-injected waveform change calculation section which calculates a second waveform change amount of the non-injected cylinder #1, #3 when the third injector for the cylinder #2, #4 injects fuel. The second waveform change amount of the non-injected cylinder may be shown by an integrated value of the second non-injected cylinder waveform Wu, Wu', or a pressure drop amount of the second non-injected cylinder waveform Wu, Wu'.

In step S44, the apparatus calculates the injection start delay time td of injections for the cylinders #4 and #2 based on the correlation coefficients Atd and Btd, and the drop delay time tdu' and tdu. The injection start delay time td is calculated as the second injection delay time. The injection start delay timing td shows an important aspect of injection state for the cylinders #4 and #2. The injection start timing td may be calculated by: td=Atd×tdu', and td=Btd×tdu. In step S44, the apparatus also calculates, i.e., estimates, the fuel injection amount Q for the cylinders #4 and #2 based on the correlation coefficients AQ and BQ, and the pressure drop amounts ΔPu and ΔPu'. This step provides an injection state estimating section which estimates fuel injection state injected from the third injector for the cylinders #2 and #4 based on the second non-injected cylinder waveform Wu, Wu' and the correlations Atd, AQ, Btd, and BQ. The injection state estimation section estimates a second injection delay time tdb, td as the fuel injection state based on the second drop delay time tdu, tdu' and the correlation Atd, Btd. The second injection delay time shows a response delay of injection state of the third injector for the cylinders #2 and #4 with respect to an injection start command signal to the third injector. The injection state estimation section also estimates the fuel injection amount from the third injector for the cylinders #2 and #4 based on the second waveform change amount of the non-injected cylinder and the correlations AQ and BQ.

In step S45, the injection amount rate Q/Tq and the injection start delay time td are learned by storing the Q/Tq and td in the estimated value maps MA and MB. The injection amount rate Q/Tq is a ratio of the injection amount calculated in the step S44 with respect to the injection command period Tq. In this step, both the injection amount rate Q/Tq and the injection start delay time td are stored in a manner that both the injection amount rate Q/Tq and the injection start delay time td are linked or associated with the standard pressure Pbase calculated in the step S41. The injection amount rate Q/Tq and the injection start delay time td observed when the injection and the pressurizing period overlap each other, i.e., the injection for the cylinder #2 are stored in the estimated value map MB. The injection amount rate Q/Tq and the injection start delay time td observed when the injection and the pressurizing period does not overlap each other, i.e., the injection for the cylinder #4 are stored in the estimated value map MA.

According to this embodiment, it is possible to estimate injection state for the cylinder of which injector has no fuel pressure sensor. In detail, in this embodiment, while the injector 10 for the cylinders #2 and #4 has no fuel pressure sensor, the apparatus can estimate the injection state of the injectors 10 for the cylinders #4 and #2. That is, it is possible to decrease the number of fuel pressure sensors 20 in the system. Even the number of fuel pressure sensor 20 is reduced, it is still possible to estimate the injection state for the cylinder of which fuel pressure sensor is eliminated. The injection state for the cylinder of which fuel pressure sensor is eliminated can be estimated based on the fuel pressure sensors 20 disposed on the other injectors 10 for the other cylinders.

In detail, the apparatus estimates and learns the injection start delay time td and injection amount rate Q/Tq of injections 10 for the cylinders #4 and #2, and controls the start timing t1 and the injection command period Tq based on the learnt value in a feedback manner. Therefore, it is possible to control fuel injection state about the injector 10 for the cylinder #4 or #2 for which no fuel pressure sensor is disposed. The fuel injection state for the cylinder #4 or #2 can be controlled with sufficiently high accuracy as same as the injection state for the cylinders #1 and #3.

In addition, the correlation coefficients Atd, AQ, Btd, and BQ are learned in a form in which the correlation coefficients are associated with the standard pressure Pbase, and are learned in the pressurizing period and in the non-pressurizing period in a distinguishable manner. It is possible to improve learning accuracy. As a result, it is possible to improve learning accuracy of injection state for the cylinders #4 and #2.

In addition, the injection start delay time td and injection amount rate Q/Tq are learned in a form in which the injection start delay time td and injection amount rate Q/Tq are associated with the standard pressure Pbase, and are learned in the pressurizing period and in the non-pressurizing period in a distinguishable manner. It is possible to improve learning accuracy. As a result, it is possible to control the injection state for the cylinders #4 and #2 with high accuracy.

(Second Embodiment)

In the first embodiment, the pressure drop amount ΔPu' and ΔPu are used as the waveform change amount of the background waveforms Wu and Wu' which are used to calculate the correlation coefficients AQ and BQ relating to the fuel injection amount. Alternatively, in this embodiment, an integrated value of the background waveforms Wu and Wu' for a predetermined integration window are used as the waveform change amount of the background waveforms Wu and Wu'. The integrated value corresponds to areas Su and Su' shown by hatchings on waveforms (c) and (d) in FIG. 12. The correlation coefficient AQ and BQ are calculated by: AQ=Q/Su', BQ=Q/Su.

A start timing of the integration window can be obtained by a start timing P1$u$' and P1$u$ of pressure drop where the non-injected cylinder waveform Wu, Wu' start dropping. For the purpose of defining the integration window, the ECU 30 provides a drop start timing calculation section which calculates the start timing of pressure drop in the first non-injected cylinder waveform Wu, Wu' caused by fuel injection from the first injector 10 having the fuel pressure sensor 20. In this embodiment, the apparatus provides a drop start timing calculation section which calculates a start timing P1$u$, P1$u$' of pressure drop in the first non-injected cylinder waveform caused by fuel injection from the first injector. The first and second non-injected waveform change calculation section calculates the integrated value of the non-injected cylinder waveform Wu, Wu' as the first and second waveform change amount of the non-injected cylinder #3, #1. The first and second non-injected waveform change calculation section calculates the integrated value by integrating the non-injected cylinder waveform Wu, Wu' over an integration window. The integration window is defined with a start timing which is obtained by the start timing of pressure drop.

A finish timing of the integration window can be defined as a timing when a predetermined time teu, teu' is elapsed from the finish timing t2 of the injection command signal. The predetermined time teu, teu' may be obtained by the delay time tdu, tdu' or the injection period Tq. For example, the predetermined time teu, teu' may be set at the same period of time as the delay time tdu, tdu' from the start timing t1 to the start timing P1$u$, P1$u$', or as the injection period Tq.

For the purpose of defining the integration window, the ECU 30 provides a drop delay time calculation section which calculates a drop delay time tdu, tdu', teu, teu' until a start timing of pressure drop appearing on the first non-injected cylinder waveform Wu, Wu' from an injection start command signal to the first injector 10 having the fuel pressure sensor 20. In this embodiment, the apparatus provides a drop delay time calculation section which calculates a drop delay time tdu, tdu', teu, teu' until a start timing of pressure drop appears on the first non-injected cylinder waveform Wu, Wu' from an injection start command signal to the first injector #1, #3. The first and second non-injected waveform change calculation section calculates the integrated value of the non-injected cylinder waveform Wu, Wu' as the first and second waveform change amount of the non-injected cylinder #3, #1, The first and second non-injected waveform change calculation section calculates the integrated value by integrating the non-injected cylinder waveform Wu, Wu' over an integration window. The integration window is defined with a finish timing which is obtained by a timing when the drop delay time is elapsed from an injection finish command signal to the first injector #1, #3.

Figure 12:
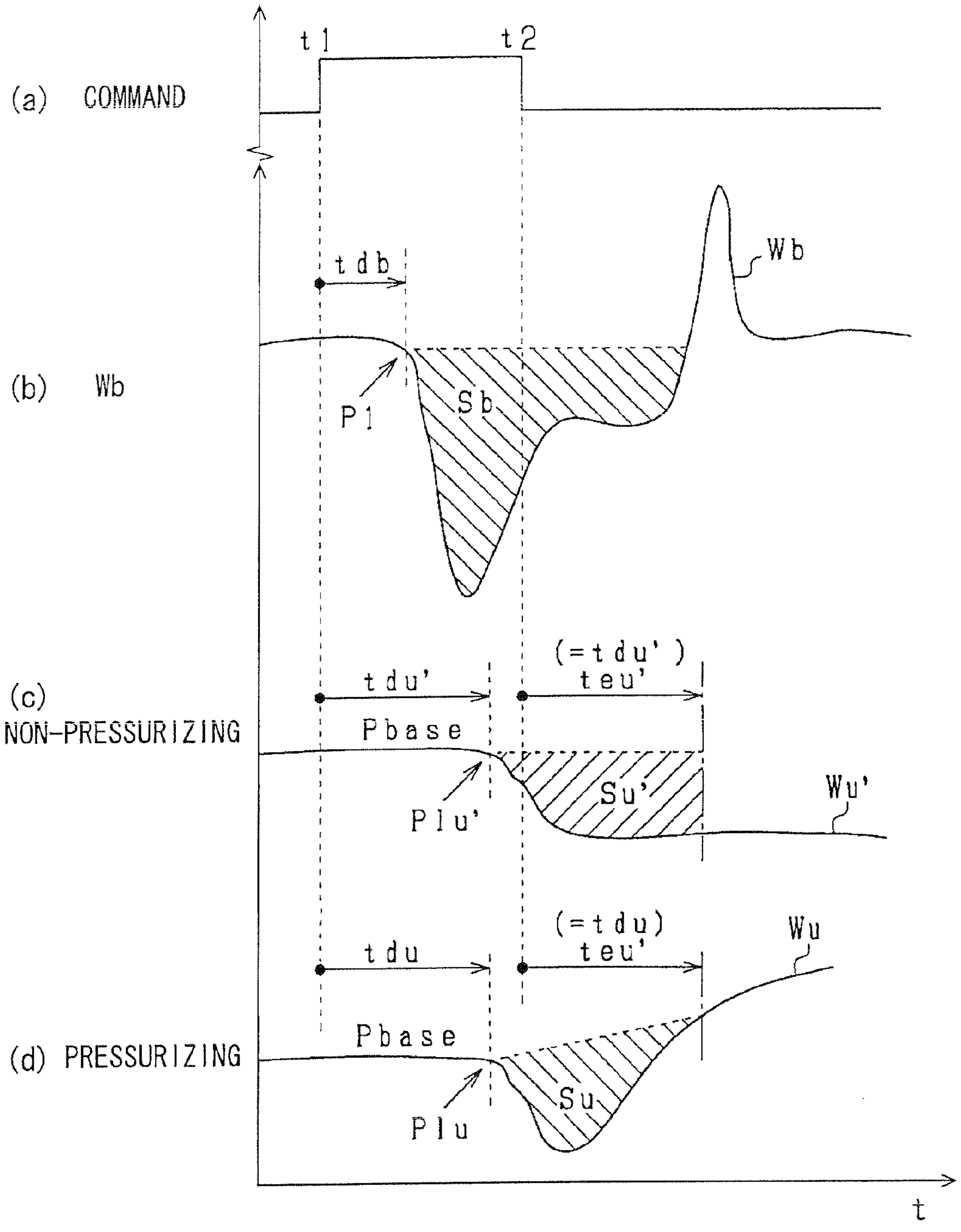
FIG. 12 is a timing diagram, which is used to show examples of correlations A1 and B1 according to a second embodiment of the present disclosure.

In the integration, as shown on a waveform (c) in FIG. 12, the ECU 30 integrates difference between the waveform Wu' and the standard pressure Pbase in the non-pressurizing period. As shown on a waveform (d) in FIG. 12, the ECU 30 integrates difference between the waveform Wu and an assumed line which connects the start timing and the finish timing of the integration window in order to compensate a pressure increasing caused by a pressurizing by the fuel pump 41.

In the first embodiment, the fuel injection amount Q defined by the injection waveform Wb is used as the waveform change amount of the injection waveform Wb which is used to calculate the correlation coefficients AQ and BQ relating to the fuel injection amount. In a fourth modification, an integrated value of the injection waveform Wb for the predetermined integration window, i.e., an area Sb shown by a hatching on the waveform (b) in FIG. 12, is used as the waveform change amount of the injection waveform Wb. In this case, the correlation coefficients AQ and BQ are calculated by: AQ=Sb/Su', BQ=Sb/Su.

Alternatively, in a fifth modification, an integrated value Sa of the composite waveform Wa for the predetermined integration window may be used as the waveform change amount of the composite waveform Wa. In this case, the correlation coefficients AQ and BQ are calculated by: AQ=Sa/Su', BQ=Sa/Su.

Advantages similar to the first embodiment can be demonstrated by the second embodiment and the fourth and fifth modifications.

(Other Embodiments)

The present disclosure is not limited to the embodiments, and may be practiced in the following modified forms. It is also possible to combine the components or parts in the embodiments.

In calculating the correlation coefficients Atd and Btd about delay time, the apparatus in the embodiments calculates the ratio between the delay time appearing on the waveform on the cylinder #1 when the cylinder #1 is injected and the delay time appearing on the waveform on the cylinder #3 when the cylinder #1 is injected as the correlation coefficients. Alternatively, the apparatus may calculate a difference between the delay time appearing on the waveform on the cylinder #1 when the cylinder #1 is injected and the delay time appearing on the waveform on the cylinder #3 when the cylinder #1 is injected as the correlation coefficients Atd and Btd.

In calculating the correlation coefficients AQ and BQ about the fuel injection amount, the apparatus in the embodiments calculates the ratio between the waveform change amount appearing on the waveform on the cylinder #1 when the cylinder #1 is injected and the waveform change amount appearing on the waveform on the cylinder #3 when the cylinder #1 is injected as the correlation coefficients. Alternatively, the apparatus may calculate a difference between the waveform change amount appearing on the waveform on the cylinder #1 when the cylinder #1 is injected and the waveform change amount appearing on the waveform on the cylinder #3 when the cylinder #1. is injected as the correlation coefficients AQ and BQ.

The learning section 32$a$ in FIG. 9 learns the injection start delay time td and the fuel injection amount rate Q/Tq. These learnt values may be referred to as the injection rate parameters necessary to identify the injection rate waveform, i.e., the injection state. Alternatively, the apparatus may be configured to estimate the injection rate waveform relating to injections for the cylinders #4 and #2 by the injection state estimation section 36, and to learn the estimated injection rate waveform instead of the injection rate parameters by the learning section 32$a$.

Although the present disclosure is applies to a four-cylinder engine in the embodiments, it is possible to practice the present disclosure for a multi-cylinder engine, such as 6-cylinder engine and an 8-cylinder engine, etc., which has at least three injectors.

Although the number of pressurizing times per one combustion cycle is two times in the embodiments, it is possible to practice the present disclosure for a fuel injection system that pressurizes fuel 3 times or 4 times per one combustion cycle, for example.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An apparatus of estimating fuel injection state of a fuel injection system having at least three injectors including a first, second and third injectors provided for a first, second and third cylinders of an internal combustion engine respectively, a first fuel pressure sensor which detects pressure of fuel supplied to the first injector, and a second fuel pressure sensor which detects pressure of fuel supplied to the second injector, the apparatus comprising:

a first acquisition section which acquires an injected cylinder waveform, the injected cylinder waveform being shown by fuel pressure change detected by the first fuel pressure sensor when the first injector injects fuel; a second acquisition section which acquires a first non-injected cylinder waveform, the first non-injected cylinder waveform being shown by fuel pressure change detected by the second fuel pressure sensor when the first injector injects fuel;

a correlation calculation section which calculates a correlation between the injected cylinder waveform and the first non-injected cylinder waveform;

a third acquisition section which acquires a second non-injected cylinder waveform, the second non-injected cylinder waveform being shown by fuel pressure change detected by the first or second fuel pressure sensor when the third injector injects fuel;

an injection state estimation section which estimates fuel injection state injected from the third injector based on the second non-injected cylinder waveform and the correlation;

an injection delay calculation section which calculates a first injection delay time showing a response delay of injection state with respect to an injection start command signal to the first injector based on the injected cylinder waveform;

a first drop delay calculation section which calculates a first drop delay time until the first non-injected cylinder waveform begins dropping from the injection start command signal to the first injector; and a second drop delay calculation section which calculates a second drop delay time until the second non-injected cylinder waveform begins dropping from the injection start command signal to the third injector, wherein the correlation calculation section calculates the correlation between the first injection delay time and the first drop delay time, and wherein the injection state estimation section estimates a second injection delay time as the fuel injection state based on the second drop delay time and the correlation, the second injection delay time showing a response delay of injection state of the third injector with respect to an injection start command signal to the third injector.

2. The apparatus of estimating fuel injection state in claim 1, further comprising:

an injected waveform change calculation section which calculates a waveform change amount of the injected cylinder, the waveform change amount of the injected cylinder being shown by an amount of injected fuel from the first injector calculated based on the injected cylinder waveform, an integrated value of the injected cylinder waveform, or a pressure drop amount of the injected cylinder waveform;

a first non-injected waveform change calculation section which calculates a first waveform change amount of the non-injected cylinder, the first waveform change amount of the non-injected cylinder being shown by an integrated value of the non-injected cylinder waveform, or a pressure drop amount of the non-injected cylinder waveform; and a second non-injected waveform change calculation section which calculates a second waveform change amount of the non-injected cylinder when the third injector injects fuel, the second waveform change amount of the non-injected cylinder being shown by an integrated value of the second non-injected cylinder waveform, or a pressure drop amount of the second non-injected cylinder waveform, wherein the correlation calculation section calculates the correlation between the waveform change amount of the injected cylinder and the first waveform change amount of the non-injected cylinder, and wherein the injection state estimation section estimates an amount of injected fuel from the third injector based on the second waveform change amount of the non-injected cylinder and the correlation.

3. The apparatus of estimating fuel injection state in claim 2, further comprising:

a drop start timing calculation section which calculates a start timing of pressure drop in the first non-injected cylinder waveform caused by fuel injection from the first injector, wherein the first and second non-injected waveform change calculation section calculates the integrated value of the non-injected cylinder waveform as the first and second waveform change amount of the non-injected cylinder, and calculates the integrated value by integrating the non-injected cylinder waveform over an integration window, the integration window being defined with a start timing which is obtained by the start timing of pressure drop.

4. The apparatus of estimating fuel injection state in claim 2, further comprising:

a drop delay time calculation section which calculates a drop delay time until a start timing of pressure drop appears on the first non-injected cylinder waveform from an injection start command signal to the first injector, wherein the first and second non-injected waveform change calculation section calculates the integrated value of the non-injected cylinder waveform as the first and second waveform change amount of the non-injected cylinder, and calculates the integrated value by integrating the non-injected cylinder waveform over an integration window, the integration window being defined with a finish timing which is obtained by a timing when the drop delay time is elapsed from an injection finish command signal to the first injector.

5. The apparatus of estimating fuel injection state in claim 1, wherein the fuel injection system further includes a fuel pump and a pressurized fuel container which are configured to accumulate fuel pressurized by the fuel pump in the pressurized fuel container, and to deliver pressurized fuel from the pressurized fuel container to the first, second and third injectors, and wherein the correlation calculation section distinguishes and calculates the correlation in a distinguishable manner depending on whether the injected cylinder waveform and the first and second non-injected cylinder waveform are detected in a pressurizing period or in a non-pressurizing period of the fuel pump, and wherein the injection state estimation section selects the correlation to be used for estimation of the fuel injection state, according to whether the second non-injected cylinder waveform is detected at the pressurizing period or in the non-pressurizing period of the fuel pump.

6. The apparatus of estimating fuel injection state in claim 1, further comprising:

a storage section which stores the correlation calculated by the correlation calculation section in a map in a manner that the correlation is associated with pressure just before the injected cylinder waveform starts dropping, wherein the correlation calculation section obtains the correlation to be used for the estimation based on pressure just before the second non-injected cylinder waveform starts dropping and the map.

7. The apparatus of estimating fuel injection state in claim 1, wherein the fuel injection system further includes a fuel pump and a pressurized fuel container which are configured to accumulate fuel pressurized by the fuel pump in the pressurized fuel container, and to deliver pressurized fuel from the pressurized fuel container to the first, second and third injectors, and wherein the first fuel pressure sensor is disposed on a fuel passage from an outlet of the pressurized fuel container to a nozzle hole of the first injector.

8. An apparatus of estimating fuel injection state of a fuel injection system having at least three injectors including a first, second and third injectors provided for a first, second and third cylinders of an internal combustion engine respectively, a first fuel pressure sensor which detects pressure of fuel supplied to the first injector, and a second fuel pressure sensor which detects pressure of fuel supplied to the second injector, the apparatus comprising:

a first acquisition section which acquires an injected cylinder waveform, the injected cylinder waveform being shown by fuel pressure change detected by the first fuel pressure sensor when the first injector injects fuel; a second acquisition section which acquires a first non-injected cylinder waveform, the first non-injected cylinder waveform being shown by fuel pressure change detected by the second fuel pressure sensor when the first injector injects fuel;

a correlation calculation section which calculates a correlation between the injected cylinder waveform and the first non-injected cylinder waveform;

a third acquisition section which acquires a second non-injected cylinder waveform, the second non-injected cylinder waveform being shown by fuel pressure change detected by the first or second fuel pressure sensor when the third injector injects fuel;

an injection state estimation section which estimates fuel injection state injected from the third injector based on the second non-injected cylinder waveform and the correlation;

an injected waveform change calculation section which calculates a waveform change amount of the injected cylinder, the waveform change amount of the injected cylinder being shown by an amount of injected fuel from the first injector calculated based on the injected cylinder waveform, an integrated value of the injected cylinder waveform, or a pressure drop amount of the injected cylinder waveform;

a first non-injected waveform change calculation section which calculates a first waveform change amount of the non-injected cylinder, the first waveform change amount of the non-injected cylinder being shown by an integrated value of the non-injected cylinder waveform, or a pressure drop amount of the non-injected cylinder waveform; and a second non-injected waveform change calculation section which calculates a second waveform change amount of the non-injected cylinder when the third injector injects fuel, the second waveform change amount of the non-injected cylinder being shown by an integrated value of the second non-injected cylinder waveform, or a pressure drop amount of the second non-injected cylinder waveform, wherein the correlation calculation section calculates the correlation between the waveform change amount of the injected cylinder and the first waveform change amount of the non-injected cylinder, and wherein the injection state estimation section estimates an amount of injected fuel from the third injector based on the second waveform change amount of the non-injected cylinder and the correlation.

9. The apparatus of estimating fuel injection state in claim 8, further comprising:

a drop start timing calculation section which calculates a start timing of pressure drop in the first non-injected cylinder waveform caused by fuel injection from the first injector, wherein the first and second non-injected waveform change calculation section calculates the integrated value of the non-injected cylinder waveform as the first and second waveform change amount of the non-injected cylinder, and calculates the integrated value by integrating the non-injected cylinder waveform over an integration window, the integration window being defined with a start timing which is obtained by the start timing of pressure drop.

10. The apparatus of estimating fuel injection state in claim 8, further comprising:

a drop delay time calculation section which calculates a drop delay time until a start timing of pressure drop appears on the first non-injected cylinder waveform from an injection start command signal to the first injector, wherein the first and second non-injected waveform change calculation section calculates the integrated value of the non-injected cylinder waveform as the first and second waveform change amount of the non-injected cylinder, and calculates the integrated value by integrating the non-injected cylinder waveform over an integration window, the integration window being defined with a finish timing which is obtained by a timing when the drop delay time is elapsed from an injection finish command signal to the first injector.

11. The apparatus of estimating fuel injection state in claim 8, wherein the fuel injection system further includes a fuel pump and a pressurized fuel container which are configured to accumulate fuel pressurized by the fuel pump in the pressurized fuel container, and to deliver pressurized fuel from the pressurized fuel container to the first, second and third injectors, and wherein the correlation calculation section distinguishes and calculates the correlation in a distinguishable manner depending on whether the injected cylinder waveform and the first and second non-injected cylinder waveform are detected in a pressurizing period or in a non-pressurizing period of the fuel pump, and wherein the injection state estimation section selects the correlation to be used for estimation of the fuel injection state, according to whether the second non-injected cylinder waveform is detected at the pressurizing period or in the non-pressurizing period of the fuel pump.

12. The apparatus of estimating fuel injection state in claim 8, further comprising:

a storage section which stores the correlation calculated by the correlation calculation section in a map in a manner that the correlation is associated with pressure just before the injected cylinder waveform starts dropping, wherein the correlation calculation section obtains the correlation to be used for the estimation based on pressure just before the second non-injected cylinder waveform starts dropping and the map.

13. The apparatus of estimating fuel injection state in claim 8, wherein the fuel injection system further includes a fuel pump and a pressurized fuel container which are configured to accumulate fuel pressurized by the fuel pump in the pressurized fuel container, and to deliver pressurized fuel from the pressurized fuel container to the first, second and third injectors, and wherein the first fuel pressure sensor is disposed on a fuel passage from an outlet of the pressurized fuel container to a nozzle hole of the first injector.

* * * * *